US011201818B2

(12) United States Patent
Maino et al.

(10) Patent No.: US 11,201,818 B2
(45) Date of Patent: Dec. 14, 2021

(54) SYSTEM AND METHOD OF PROVIDING POLICY SELECTION IN A NETWORK

(71) Applicant: Cisco Technology, Inc., San Jose, CA (US)

(72) Inventors: Fabio Maino, Palo Alto, CA (US); Syed Khalid Raza, Fremont, CA (US); Alberto Rodriguez Natal, Mountain View, CA (US); Marc Portoles Comeras, Mountain View, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 127 days.

(21) Appl. No.: 16/783,843

(22) Filed: Feb. 6, 2020

(65) Prior Publication Data
US 2020/0322262 A1   Oct. 8, 2020

Related U.S. Application Data

(60) Provisional application No. 62/829,034, filed on Apr. 4, 2019, provisional application No. 62/830,187, filed on Apr. 5, 2019.

(51) Int. Cl.
H04L 12/725      (2013.01)
H04L 29/08       (2006.01)
(Continued)

(52) U.S. Cl.
CPC ........ H04L 45/306 (2013.01); H04L 12/4633 (2013.01); H04L 45/64 (2013.01);
(Continued)

(58) Field of Classification Search
CPC ..... H04L 45/306; H04L 12/56; H04L 47/781; G06F 9/45558
(Continued)

(56) References Cited

U.S. PATENT DOCUMENTS 6,438,594 B1* 8/2002 Bowman-Amuah ........................ G06F 9/4488
709/225
6,466,984 B1* 10/2002 Naveh ..................... H04L 47/10
370/229

(Continued)

OTHER PUBLICATIONS

Aggarwal et al., "MPLS Upstream Label Assignment and Context-Specific Label Space", RFC 5331, 2008 (Year: 2008).*
Ballani et al., "Enabling End-Host Network Functions", 2015 (Year: 2015).*
Brooks et al., "Mobile Code Daemons for Networks of Embedded Systems", 2004 (Year: 2004).*

(Continued)

Primary Examiner — Ondrej C Vostal
(74) Attorney, Agent, or Firm — Polsinelli PC

(57) ABSTRACT

Disclosed are systems and methods for providing policy selection in a software defined network. An example method includes registering, by an enterprise controller on an enterprise domain, in a shared mapping system on a service provider domain, one or more entries specifying one or more services for one or more classes of traffic to yield registered entries, reading, by a service provider controller, from the shared mapping system, the registered entries, posting, by the service provider controller, the one or more entries to one or more routing tables at a software-defined wide area network of the service provider domain and receiving a request, by a mobile node on the enterprise domain, of a specific service for a particular class of packets according to a classification of the particular class of packets based on a particular label defined in the registered entries for the specific service.

20 Claims, 15 Drawing Sheets

(51) Int. Cl.
*H04L 12/46* (2006.01)
*H04L 12/851* (2013.01)
*H04L 29/06* (2006.01)
*H04L 12/715* (2013.01)
*H04L 12/813* (2013.01)

(52) U.S. Cl.
CPC .......... *H04L 47/20* (2013.01); *H04L 47/2441* (2013.01); *H04L 63/20* (2013.01); *H04L 67/327* (2013.01)

(58) Field of Classification Search
USPC ........................................................ 709/234
See application file for complete search history.

(56) References Cited

U.S. PATENT DOCUMENTS

| | | | | |
|---|---|---|---|---|
| 7,668,116 | B2* | 2/2010 | Wijnands | H04L 45/16 370/254 |
| 7,856,486 | B2* | 12/2010 | Robertson | H04L 67/24 709/220 |
| 8,705,374 | B1* | 4/2014 | D'Souza | H04L 65/104 370/242 |
| 9,479,433 | B1* | 10/2016 | Lewis | H04L 12/66 |
| 10,241,817 | B2* | 3/2019 | Tsirkin | G06F 9/45545 |
| 10,659,362 | B1* | 5/2020 | Sellappa | H04L 45/28 |
| 2006/0072541 | A1* | 4/2006 | Pecus | H04L 47/781 370/351 |
| 2008/0291827 | A1* | 11/2008 | Xiong | H04L 47/193 370/230.1 |
| 2011/0258410 | A1* | 10/2011 | Lambert | G06F 21/575 711/164 |
| 2013/0272141 | A1* | 10/2013 | Mashimo | H04L 45/50 370/248 |
| 2017/0026417 | A1* | 1/2017 | Ermagan | H04L 63/0272 |
| 2017/0228245 | A1* | 8/2017 | Hardy | G06F 9/45558 |

OTHER PUBLICATIONS

CloudFlare, "What is MPLS (multiprotocol label switching)?", 2021 (Year: 2021).*
Doyle, "Understanding the Role of FECs in MPLS", 2008 (Year: 2008).*
Huawei Enterprise, "What is FEC in MPLS?", 2019 (Year: 2019).*
Imaizumi et al., "FMEHR: An Alternative Approach to Multi-Path Forwarding on Packet Switched Networks", 2005 (Year: 2005).*
Kim et al., "Ultrareliable and Low-Latency Communication Techniques for Tactile Internet Services", 2019 (Year: 2019).*
Light, "A new scheduling algorithm for critical packet loss elimination during handoff in cellular networks", 2007 (Year: 2007).*
Strayer, "A Class-Chest for Deriving Transport Protocols", 1996 (Year: 1996).*
Velmurugan, "Virtual Multicast Link via Packet Re-entrance in NS2", 2011 (Year: 2011).*
Wikipedia, "Forwarding equivalence class", 2021 (Year: 2021).*
Wikipedia, "Multiprotocol Label Switching", 2021 (Year: 2021).*
Wikipedia, "Packet processing", 2021 (Year: 2021).*
International Search Report and Written Opinion from the International Searching Authority, dated Jul. 21, 2020, 13 pages, for corresponding International Patent Application No. PCT/US2020/026353.
Aggarwal, R., et al., "MPLS Upstream Label Assignment and Context-Specific Label Space," Aug. 2008, pp. 1-13.
Blake, S., et al., "An Architecture for Differentiated Services," Dec. 1998, pp. 1-36.
Brittain, Paul, et al., "MPLS Virtual Private Networks," Nov. 2000, 31 pages.
Cherukuri, Rao, et al., "Q. Flowstatesig draft—Clause 7.3.1 DSCP code point and other issues," Juniper Networks; Verizon, Cisco Systems, AT&T, Telefon AB—LM Ericsson Nokia Siemens Networks GMBH & Co. KG, Jan. 2010, 3 pages.

* cited by examiner

SYSTEM AND METHOD OF PROVIDING POLICY SELECTION IN A NETWORK

CROSS-REFERENCE TO RELATED APPLICATIONS

This application claims priority to U.S. Provisional Patent Application No. 62/829,034, filed on Apr. 4, 2019, and U.S. Provisional Patent Application No. 62/830,187, filed on Apr. 5, 2019, the contents of which are incorporated herein by reference in their entirety.

TECHNICAL FIELD

The present disclosure generally relates to the field of computer networking, and more particularly to various approaches for determining policies within a computing environment based on a number of different factors. One aspect relates to software-defined wide-area-network (SD-WAN) policy selection across trust domains and another aspect relates to time-variant trust-driven policy selection in on-demand networking solutions.

BACKGROUND

A first aspect of this disclosure relates to wide area networks (WAN) and policies. The enterprise network landscape is continuously evolving. There is a greater demand for mobile and Internet of Things (IoT) device traffic, Software as a Service (SaaS) applications, and cloud adoption. In addition, security needs are increasing and certain applications can require prioritization and optimization for proper operation. As this complexity grows, there is a push to reduce costs and operating expenses while providing for high availability and scale.

Conventional WAN architectures are facing major challenges under this evolving landscape. Conventional WAN architectures typically consist of multiple Multi-Protocol Label Switching (MPLS) transports, or MPLS paired with Internet or Long-Term Evolution (LTE) links used in an active/backup fashion, most often with Internet or SaaS traffic being backhauled to a central data center or regional hub for Internet access. Issues with these architectures can include insufficient bandwidth, high bandwidth costs, application downtime, poor SaaS performance, complex operations, complex workflows for cloud connectivity, long deployment times and policy changes, limited application visibility, and difficulty in securing the network.

In recent years, software-defined wide-area network (SD-WAN) solutions have been developed to address some of these challenges. SD-WAN is part of a broader technology of software-defined networking (SDN). SDN is a centralized approach to network management which can abstract away the underlying network infrastructure from its applications. This de-coupling of data plane forwarding and control plane can allow a network operator to centralize the intelligence of the network and provide for more network automation, operations simplification, and centralized provisioning, monitoring, and troubleshooting. SD-WAN can apply these principles of SDN to the WAN.

Another aspect of this disclosure relates to policies associated with trust. Trustworthiness of a give device operating within a network may degrade from the time of its initial configuration. Active measurements may be needed to validate that a device is equivalently trustworthy to the time of its initial deployment. New technologies such as TPM (Trusted Platform Module), Aikido, and "canary stamps" are adding capabilities which support the secure, real-time reporting of active trustworthiness measurements/evaluation from a remote device.

Based on the results from such technologies, additional analysis and remediation methods can be invoked to reduce/mitigate the effects of attacks. For example, an integrity verification application based on a controller can invoke the validating specific portions of device memory. When errors are found during such a check, it allows the integrity verification application to implement steps in order for a device to be returned to a good state.

Such memory verification checks are expensive however and such checks by themselves imply that a device is more likely to be in a good state soon after device validation, and less likely to be in a good state just before a device validation. The result of this implication is that it should be possible to use historical and operational data to quantify and graph the likelihood of compromise for a specific device since the last device validation.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
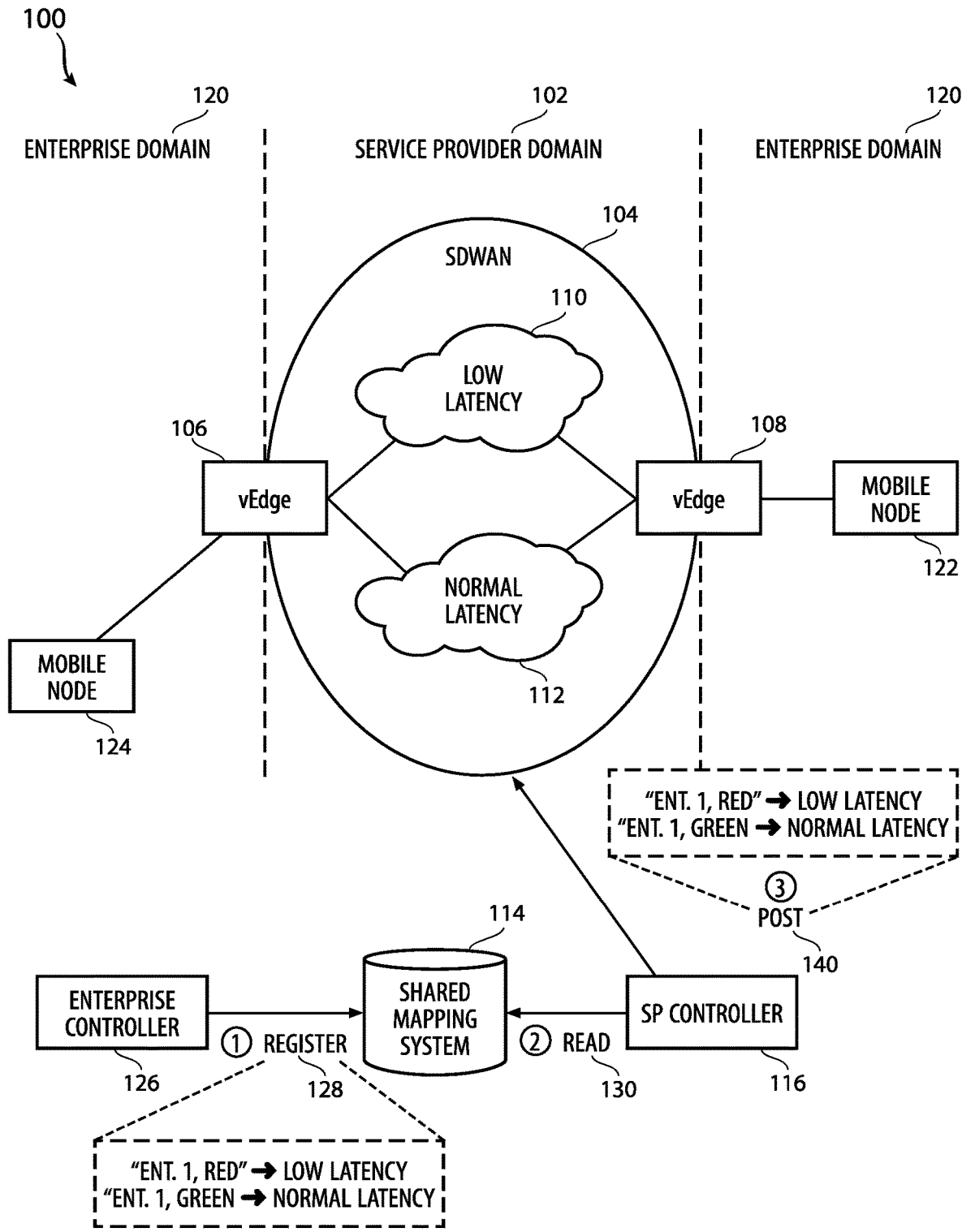
FIG. 1 illustrates an example network environment with disjoint trust domains, in accordance with some implementations.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

First aspect of this disclosure relates to SD-WANs and how one can implement a particular policy according to data embedded within a packet. An example method includes registering, by an enterprise controller on an enterprise domain, in a shared mapping system on a service provider domain, one or more entries specifying one or more services for one or more classes of traffic to yield registered entries, reading, by a service provider controller, from the shared mapping system, the registered entries, posting, by the service provider controller, the one or more entries to one or more routing tables at a software-defined wide area network of the service provider domain and receiving a request, by a mobile node on the enterprise domain, of a specific service for a particular class of packets according to a classification of the particular class of packets based on a particular label defined in the registered entries for the specific service.

The second aspect of this disclosure relates to trust and selecting a trust-related policy in a network. As noted above, memory verification checks are expensive. Such checks by themselves imply that a device is more likely to be in a good state soon after device validation, and less likely to be in a good state just before a device validation. The result of this implication is that it should be possible to use historical and operational data to quantify and graph the likelihood of compromise for a specific device since the last device validation.

Getting to such a quantification of trustworthiness is non-trivial. And being able to determine instantaneous trustworthiness means an operator will have to have an understanding of: how quickly device trustworthiness degrades in a particular deployment environment; the visible events which when taken together are potential indicators of compromise; and how instantaneous device trustworthiness can be improved via invoking actions such as memory and configuration checks.

Considering this context and the factors above, the second aspect of this application describes an estimation formula for device trustworthiness evaluation based on probabilities of visible indicators of security compromises for a given device and probabilities of invisible (time based) indicators of security compromises for the give device.

Many things can be done with the results of such a trustworthiness estimation formula when it is located on a controller: Sensitive traffic/flows can be routed around elements with less trustworthiness. Even if a sensitive flow is encrypted, an attackers knowledge possibly gleaned from a compromised device that traffic is being passed between endpoints can be harmful. Memory checks or configuration validations can be prioritized to be run on a remote device. For example, the formula allows the scheduling of such checks to be needs based, rather than scheduled regardless of underlying conditions; the business value of the function can be considered when determining when to schedule memory checks or configuration validation; the integrity of key data structure/subsystems can be assessed, rather than just the platform as a whole. This could include forwarding data structures that might need to be reconstructed; and the integrity/consistency of hardware based subsystems within a router/switch itself could be analyzed. For example, the consistency of satellite nodes, line-cards, or even hardware registers (ACL, FIB, etc.) could be checked/refreshed.

Description of Example Embodiments

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

As noted above, this application introduces two different approaches to handling policy selection within a network environment. The first approach will relate to a SDWAN environment and the second approach will relate to time-variant trust driven policies in an on-demand network.

The first aspect of the present disclosure addresses the need in the art for ensuring that on a managed SDWAN deployment, an enterprise customer and the service provider agree on which policies should be applied to a particular flow originated by the customer. In some examples, the approaches herein can implement a mapping system shared infrastructure to broker SLAs (Service Level Agreements) and classification in a customer and service provider solution.

The present technologies will be described in the context of a "mobileSDWAN" (or mSDWAN) use case. However, it should be noted that the present technologies can also apply to other networks and use cases, such as other SDWAN implementations. The mSDWAN use case is provided herein for clarity and explanation purposes, as the mSDWAN use case can provide clear examples of the various scalability issues and the separation of domains that are typical of managed SDWAN services.

An mSDWAN deployment 100 as shown in FIG. 1 can include a managed SDWAN 104 having vEdges 106, 108 that are used as attachment points for mobile devices 122, 124 that will attach to the vEdges 106, 108 in order to use transport services from the managed SDWAN 104. Typically, the SDWAN 104 is part of a service provider domain 102 and is managed by the service provider controller 116 while the mobile devices 122, 124 are managed by the enterprise domain(s) 120 that are the service provider (SP) customers.

The mSDWAN mobile device 122, 124 can perform a fine grain classification of the application/user/device that is generating a packet flow, and insert a label in each packet that represents the classification performed at the mobile edge 106, 108. This label provides the "context" as classified by the mobile device 122, 124. The context can be used at the ingress edge 106, 108 of the SDWAN 104 to apply the appropriate policy. Note that in some instances, the classification function can be performed by a customer premises equipment (CPE) (not shown) sitting in front of the vEdge 106, 108 rather than at the mobile device 122, 124.

A mechanism as described herein can specify, per enterprise customer, which SDWAN SLA should be applied to packets tagged with a specific label. For example, an SDWAN 104 may offer low latency transport 110 and normal transport 112 between any two vEdges 106, 108 of the SDWAN 104. Similarly, different encryption SLAs might be offered, or other level of services, such as storage services, or access to specific service nodes for speech processing or encoding services. Thus, the disclosure is not limited to latency service at a particular level but can apply to any service or combination of services provided by the domain 102. The present disclosure can use a mapping service, accessible to both the enterprise customer and the SDWAN service provider, as a way to specify the mapping, used by a given customer, between the label used to classify the traffic and the policy applied at the SDWAN edge 106,108.

As an example, Enterprise A may use label "red" to tag traffic that should receive low latency services from the SDWAN, and label "green" to identify traffic that should receive normal latency transport services 140. The controller of Enterprise A 126 can register in the shared mapping system 114 two entries specifying that: "ent 1, red"-> low latency and "ent 1, green"-> normal latency 128. Of course any label can do beyond selecting a color.

Another enterprise may use different labels to identify the same policies offered by the SDWAN provider. Now the service provider can reflect in its SDWAN routing tables the association between the labels used by an enterprise customer and the corresponding policy rules that will be applied.

If the mobile device 122, 124 wants to request a low latency service 110 for a particular class of packets, it can simply label those packets as "red". The ingress vEdge 106, 108 can use that classification to properly route that packet on a low latency path 110, as shown in FIG. 1. Note that in certain instances, if the vEdge 106, 108 has not received the routing policy for "red" packets, it can pull it on-demand. The SP controller 16 can access the shared mapping system 114 and provide the data to the SDWAN 104.

FIG. 1 also illustrates the example networking environment 100 having disjoint trust domains. The disjoint trust domains include a service provider domain 102 and an enterprise domain 120. The service provider domain 102 includes a managed SDWAN 104 having vEdges 106 and 108 that are used as attachment points for mobile devices 122 and 124 in the enterprise domain 120. The mobile devices 122 and 124 attach to the vEdges 106 and 108 in order to use transport services from the SDWAN 104 or other services available through the SDWAN 104. The SDWAN 104 can include a low latency transport 110 and a normal latency transport 112. These different transports represent an example service provided to the mobile devices 122, 124 that can be offered at different quality levels according to the mapping to certain policies.

An enterprise controller 126 on the enterprise domain 120 can register 128 in a shared mapping system 114 on the service provider domain 102 entries specifying different latency transports (or other services) for different traffic. The different traffic can be identified by labels tagging the traffic according to the respective latency transport for that traffic. In this example, the enterprise controller 126 registers in the shared mapping system 114 a first entry specifying that traffic labeled or tagged "Ent. 1, Red" should receive low latency (e.g., low latency transport 110), and traffic labeled or tagged "Ent. 1, Green" should receive normal latency (e.g., normal latency transport 112).

A service provider controller 116 can then read, from the shared mapping system 114, the registered entries, and post 140 such entries to the routing tables at SDWAN 104. Once the service provider controller 116 has posted 140 the entries, the service provider 102 can reflect in its SDWAN routing tables the association between the labels used by the enterprise domain 120 and the corresponding policy rules that will be applied.

If the mobile nodes 122 or 124 want to request a low latency service 110 for a particular class of packets, the mobile nodes 122 or 124 can simply label those packets as "red". The ingress vEdge 106 or 108 can use that classification to properly route that packet on the low latency transport 110. Similarly, if the mobile nodes 122 or 124 want to request a normal latency service for a particular class of packets, the mobile nodes 122 or 124 can simply label those packets as "green". The ingress vEdge 106 or 108 can use that classification to properly route that packet on the normal latency transport 112.

Figure 2:
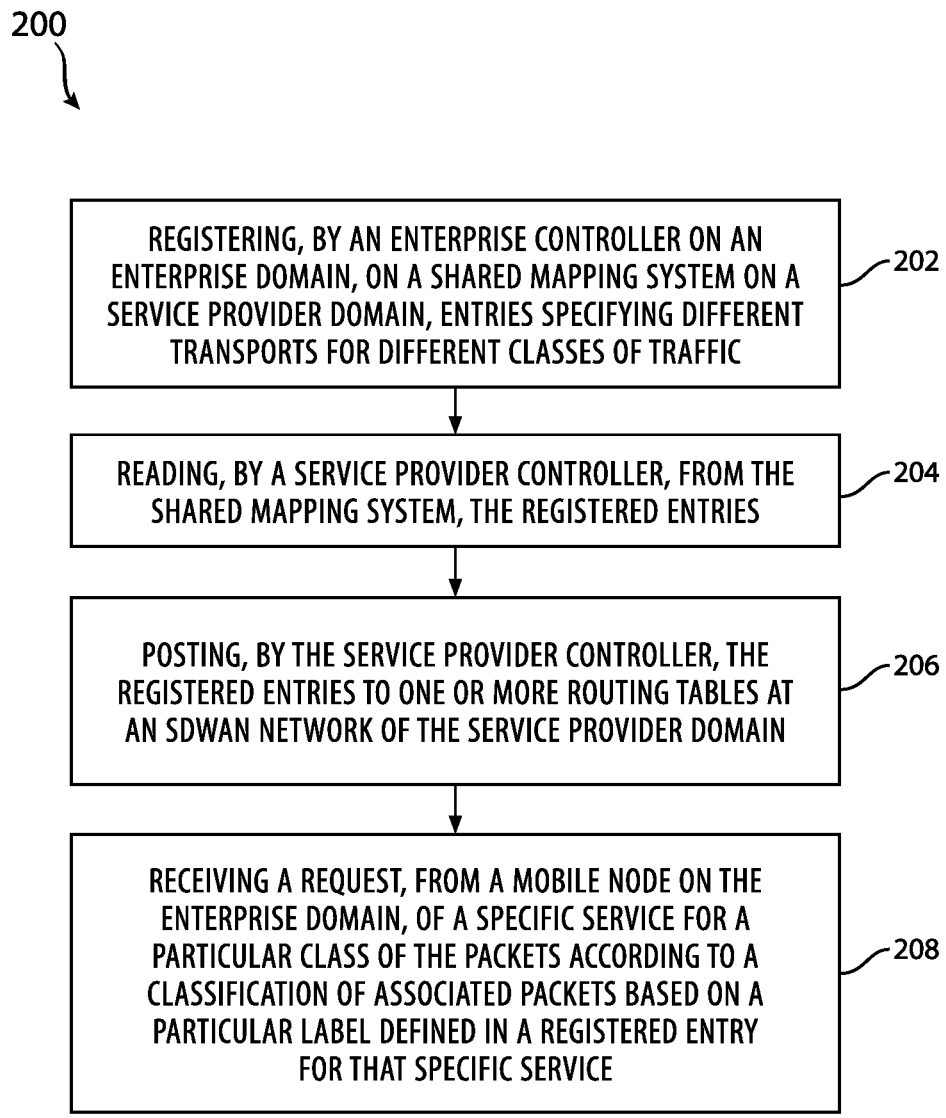
FIG. 2 illustrates an example method for SDWAN policy selection across disjoint trust domains, in accordance with some implementations.

FIG. 2 illustrates an example method 200 for SDWAN policy selection across disjoint trust domains. The method can include any one or more of these steps in any order. At step 502, an enterprise controller 126 on an enterprise domain 120 can register in a shared mapping system 114 on a service provider domain 102 entries specifying different latency transports or different services for different classes of traffic. The different classes of traffic can be identified by labels tagging the traffic according to the respective latency transport (e.g., 110, 112) or service for that traffic. For example, the enterprise controller 126 can register in the shared mapping system 114 a first entry specifying that traffic labeled or tagged "Ent. 1, Red" should receive low latency (e.g., low latency transport 110), and traffic labeled or tagged "Ent. 1, Green" should receive normal latency (e.g., normal latency transport 112).

At step 204, a service provider controller 116 can read, from the shared mapping system 114, the registered entries, and at step 206 post such entries to the routing tables at an SDWAN 104 of the service provider 102. Once the service provider controller 116 has posted the entries, the service provider 102 can reflect in its SDWAN routing tables the association between the labels used by the enterprise domain 120 and the corresponding policy rules that will be applied.

At step 208, a mobile node (e.g., 122 or 124) on the enterprise domain 120 can request a specific latency service for a particular class of packets by classifying (e.g., labeling, tagging, etc.) associated packets based on a particular label defined in a registered entry for that specific latency service. From a system standpoint, the vEdge 108 can receive a request for a specific service at a certain level. The ingress vEdge 106 or 108 can use that classification to properly route that packet on the specific latency service (e.g., low latency transport 110, normal latency transport 112) or to provide the certain quality of service for the flow, such as a certain bandwidth, amount of storage data, encryption services, etc.

Claims can be drafted using the principles set forth above from the aspect of different components within FIG. 1. For example, the disclosure can include the steps performed from the standpoint of the mobile node 122, 124, or from the standpoint of the SP controller 116, or shared mapping system 114. Claims can focus on the processes from the standpoint of the vEdge 106, 108. In some cases, an embodiment could be described using processes performed by two or more of these components.

The disclosure now turns to the second aspect which relates to trust and selecting a trust-related policy in a network. Memory verification checks are expensive. Such checks by themselves imply that a device is more likely to be in a good state soon after device validation, and less likely to be in a good state just before a device validation. The result of this implication is that it should be possible to use historical and operational data to quantify and graph the likelihood of compromise for a specific device since the last device validation.

Getting to such a quantification of trustworthiness is non-trivial. And being able to determine instantaneous trustworthiness means an operator will have to have an understanding of: how quickly device trustworthiness degrades in a particular deployment environment; the visible events which when taken together are potential indicators of compromise; and how instantaneous device trustworthiness can be improved via invoking actions such as memory and configuration checks.

Considering this context and the factors above, the second aspect of this application describes an estimation formula for device trustworthiness evaluation based on probabilities of visible indicators of security compromises for a given device and probabilities of invisible (time based) indicators of security compromises for the give device.

Many things can be done with the results of such a trustworthiness estimation formula when it is located on a controller. For example, sensitive traffic/flows can be routed around elements with less trustworthiness. This can occur even if a sensitive flow is encrypted, an attackers knowledge possibly gleaned from a compromised device that traffic is being passed between endpoints can be harmful. Memory checks or configuration validations can be prioritized to be run on a remote device. In one aspect, the formula allows the scheduling of such checks to be needs based, rather than scheduled regardless of underlying conditions. The business value of the function can be considered when determining when to schedule memory checks or configuration validation; the integrity of key data structure/subsystems can be assessed rather than just the platform as a whole. This could include forwarding data structures that might need to be reconstructed; and the integrity/consistency of hardware based subsystems within a router/switch itself could be analyzed. For example, the consistency of satellite nodes, line-cards, or even hardware registers (ACL, FIB, etc.) could be checked/refreshed.

Certain previous systems rely on the freshness (e.g., the recency) of measurements of a node in order to verify the security (e.g., trustworthiness) of the node. This is problematic because the reliability and accuracy of the verification is proportional to the frequency with which measurements are taken. Accordingly, a high utilization of network resources corresponds to a high reliability system, and vice versa. Another problem with a freshness-based system is that an attacker can inject previously recorded measurements into the node being verified (e.g., after gaining root access) in order to give the false appearance that the node has not been compromised. By contrast, various implementations disclosed herein verify the security (e.g., trustworthiness) of a node by comparing trusted information against corresponding information obtained from the node. In this way, verification proceeds irrespective of the freshness of information at the node. Moreover, utilization of the trusted information guards against the event where an attacker has changed information at the node.

Certain other previous systems provide a transactional process between the node making the verification request and the measurement device. For example, the requesting node provides a random number (e.g., a nonce) to the measurement device, which provides a signature across the response, including the returned random number itself. This indicates that the information is not being replayed from a time before the random number was available to the measurement device. Such a dependency of the requesting node for each signed response is problematic because the system is grounded in a transactional challenge and/or response interaction model. In other words, this system does not support unidirectional verification communications originating from the requesting node, such as an asynchronous push, multicast, broadcast message, and/or the like. By contrast, the attestation based routing disclosed herein supports these types of communications.

An example-time-based attestation mechanism is a Canary Stamp. The Canary Stamp allows elements in a network to ascertain if the source of information has been compromised. In addition, the Canary Stamp provides a structure to assign a level of trust to the information that is shared. The following is a discussion of canary stamps or attestation data which can be applicable for the trust-related concepts disclosed herein.

Canary Stamps

A computer network can include different nodes (e.g., network devices, client devices, sensors, and any other computing devices) interconnected by communication links and segments for sending data between end nodes. Many types of networks are available, including, for example, local area networks (LANs), wide area networks (WANs), software-defined networks (SDNs), wireless networks, core networks, cloud networks, the Internet, etc. When data traffic is transmitted through one or more networks, the data traffic typically traverses a number of nodes that route the traffic from a source node to a destination node.

While having numerous nodes can increase network connectivity and performance, it also increases security risks as each node that a packet traverses introduces a risk of unauthorized data access and manipulation. For example, when a packet traverses a node, there is a security risk that is introduced which can result from the node being potentially compromised (e.g., hacked, manipulated, captured, etc.). As a result, compliance, security, and audit procedures can be implemented to verify that network users, devices, entities and their associated network traffic comply with specific business and/or security policies.

When sensitive information is transmitted through nodes in a network, such as in battlefield, banking settings, and healthcare settings, such traffic should be sent through uncompromised nodes to prevent access to, leakage of, or tampering with the data and sensitive information carried by that traffic. If an attacker gains access to a device via some exploit, previous protection and encryption approaches for network interfaces are generally ineffective at mitigating or addressing such unauthorized access and resulting damage.

Proving that network traffic complies with specific policies can involve proving in a secure way that the traffic has traversed a well-defined set of network nodes (e.g., firewalls, switches, routers, etc.) and that such network nodes have not been modified or compromised. This can help ensure that the network nodes have performed their expected or intended actions (e.g., packet processing, security or policy compliance verification, routing, etc.) on the packet and that the packet has traversed the network nodes.

Some security approaches can aim at removing any implied trust in the network used for connecting applications hosted on devices to cloud or enterprise hosted services.

Moreover, some security approaches can be implemented to verify the trustworthiness (e.g., the integrity, identity, state, etc.) of the network and/or nodes traversed by packets. In some cases, certain verification checks can be implemented to validate or verify that traffic has traversed a specific set of nodes and that such nodes are trusted and uncompromised. In some examples, certain Proof-of-Transit (POT), Trusted Platform Module (TPM), attestation, or proof of integrity approaches can be implemented to verify or validate the trustworthiness of a node in a network.

POT can enable a network user or entity to verify whether traffic traversed a defined set of network nodes. Attestation, as further described below, can also be used to verify the integrity of a node. In some cases, the approaches herein can integrate both to offer a secure approach that allows network users or entities to verify that traffic has traversed a defined set of nodes and that such nodes have not been compromised.

In some cases, TPM can be implemented to collect and report the identity of hardware and software components in a platform to establish trust for that platform. A TPM used in a computing system can report on the hardware and software of the system in a manner that allows verification of expected behavior associated with that system and, from such expected behavior, establishment of trust. The TPM can be a system component containing state that is separate from the host system on which the TPM reports identity and/or other information. TPMs can be implemented on physical resources (indirectly or directly) of the host system. In some examples, a TPM component can have a processor and memory such as RAM, ROM and/or flash memory. In other implementations of a TPM, a host processor can run TPM code while the processor is in a particular execution mode. Parts of system memory can be partitioned by hardware to ensure that memory used by the TPM is not accessible by the host processor unless the host processor is in the particular execution mode.

In some cases, trusted computing (TC) implementations, such as TPM, can rely on Roots of Trust. Roots of Trust can be system elements that should be trustworthy because misbehavior by such system elements may not be detectable. A set of roots can provide a minimum functionality that can sufficiently describe characteristics that affect a platform's trustworthiness. In some cases, determining if a Root of Trust is behaving properly may not be possible; however, it may be possible to determine how roots are implemented. For example, certificates can provide assurances that the root has been implemented in a way that renders it trustworthy.

To illustrate, a certificate may identify the manufacturer and evaluated assurance level (EAL) of a TPM. Such certification can provide a level of confidence in the Roots of Trust used in the TPM. Moreover, a certificate from a platform manufacturer may provide assurance that the TPM was properly installed on a system that is compliant with specific requirements so the Root of Trust provided by the platform may be trusted. Some implementations can rely on three Roots of Trust in a trusted platform, including Root of Trust for Measurement (RTM), Root of Trust for Storage (RTS), and Root of Trust for Reporting (RTR).

The RTM can send integrity information, such as integrity measurements, to the RTS. Generally, the RTM can be a processor controlled by a Core Root of Trust for Measurement (CRTM). The CRTM is the first set of instructions executed when a new chain of trust is established. When a system is reset, the processor (e.g., RTM) can execute the CRTM, which can then send values that indicate its identity to the RTS. Thus, in some cases, the starting point for a chain of trust can be established in this manner.

As previously noted, the TPM memory can be shielded from access by an entity other than the TPM. Since the TPM can be trusted to prevent unauthorized access to its memory, the TPM can act as an RTS. Moreover, the RTR can report on the contents of the RTS. An RTR report can be a digitally signed digest of the contents of one or more values in a TPM.

Attestation is another example trusted computing approach that can be used to verify the integrity of a node. Attestation can be applied to a node, such as a router or switch, to review logs from connected devices, such as Layer 1 (L1) or Layer (L2) connected devices and maintain these logs in trusted storage. These logs can be protected by embedding a private key into every trust anchor produced for a hardware device and publishing the device's public key as a certificate to adjacent devices. This peering device can then push log updates from trusted storage periodically and/or on some log entry event. Reviewing any provided signed logs can provide an understanding of the current trustable state of a peer device. Moreover, by looking back at the set of transactions which have occurred since boot time, a determination can be made regarding the trustworthiness of the information which that peer device is asserting.

In some examples, metadata elements containing security measurements or evidence, can be used to provide verifiable evidence of device trustworthiness (e.g., integrity, state, etc.). The metadata elements can include applicable data for verifying trustworthiness of a device and be provided through an applicable technique for verifying device trustworthiness. For example, the metadata elements can be provided as part of a canary stamp associated with the device. A canary stamp can indicate or otherwise include a signed measurement associated with a device for verifying trustworthiness of the device. In turn, such measurements can be referred to as canary stamps because each signed measurement is like a stamp proving its authenticity, and like a canary in a coal mine that indicates an early sign of trouble. Such verifiable evidence can be appended or included in packets transmitted by nodes on a network. The metadata elements can thus be used to evaluate the trustworthiness of a node(s) and react accordingly. For example, a device or entity can review metadata element associated with a node to determine that the node should not be trusted and adjust a network policy to mitigate possible damage.

In some implementations, dedicated cryptoprocessors, such as a processor in TPM platform, can take measurements to attest to the trustworthiness (e.g., identity, integrity, etc.) of a node and its environment (e.g., software, hardware, operating system, running binaries, firmware, etc.). These measurements include evidence that the node is in a safe state. In some cases, these measurements can be provided through canary stamps, as previously described. However, a receiver of such evidence should be able to certify that the evidence is fresh, as the evidence can become stale thereby potentially reducing its effectiveness in reflecting the current trustworthiness of a node. For example, without ensuring freshness of such evidence, an attacker has an opening to inject previously recorded measurements and asserting what is replayed as being current.

Some approaches can detect the replaying of old evidence via a "nonce". A nonce is an arbitrary number that can be used to introduce randomness. In some instances, a nonce can be used just once in a cryptographic communication. Further, a nonce can be passed into a TPM and/or incorporated into a canary stamp/metadata. In some cases, a result provided by the TPM can include a signature based on the nonce. Since the nonce can be grounded in a transactional challenge/response interaction model, in some cases the nonce may be less effective with unidirectional communications originating from an attesting device. For example, a nonce may less effective with an asynchronous push, multicast, or broadcast message.

However, there are numerous use cases where a platform assessing whether its peers are trustworthy is advantageous. Being able to perform a unidirectional attestation using an asynchronous push, multicast, or broadcast message in conjunction with trusted binaries opens many possibilities for platforms to assess whether their peers are trustworthy. Detection of invalid attestations can trigger alarms or events, reduction of network access from a suspect device, or can become a part of Admission Control (e.g., IEEE 802.1X). Some platforms can be configured to support the unidirectional attestation mechanism.

Other freshness approaches can be based on trusted computing capabilities, such as TPM. For example, a token can be generated which allows external entities to validate freshness of asserted data based on the state of internal counters within the TPM. This token can be used to detect replay attacks, and provide attestation for asynchronous push, multicast, and broadcast messages.

Various of the foregoing approaches can be combined with TPM-integrated capabilities aimed at verifying that valid compute components, such as binary processes, are running on a node. These capabilities can include, for example, Trusted Execution Environments (TEE) which provide runtime malware protections, Authenticated Code Modules (ACM) which ensure that only digitally-signed code modules can be loaded into a processor, and the like. These technologies can validate that a processor is running known software with a valid chain of binary signatures.

In some cases, metadata elements, e.g. canary stamps, and tokens can be created by extracting current counters (e.g., clock, reset, restart) from a node's TPM, and incorporating such counters and security measures taken from the node into a packet. In some examples, the current counters and/or security measures can be hashed with information within an external TPM. The metadata elements and tokens can thereby provide a non-spoofable token or metadata element, which can bind continuously incrementing counters on an attestee with a known external state. Any resetting of the TPM counters is visible in any subsequent TPM queries, and any restarting of a platform is also exposed in subsequent TPM queries. Within these bounds of reset and restart, the TPM's time ticks counter continuously increments. Therefore, any push of attestee TPM information which includes these counters can be determined to have occurred subsequent to any previously-received measurement. Also, if the reset and restart counters have not changed, the incremental time since any previous measurement can also be known.

In some cases, a large amount of information that should be trusted by network peers may not be contained within the TPM's Program Configuration Registers (PCR). As a result, indirect methods of validating that a node has not been compromised can be applied.

The receipt of the metadata elements, e.g. canary stamps, and/or tokens can mean that a receiver should have the option of verifying the information. In many cases, such verification can be performed without the need of supplementary evidence being sent with the canary stamp. Moreover, in non-controller based or centralized implementations, the verification steps do not have to occur at the receiver.

In some integrity verification implementations, a controller or device can implement an integrity verification application. The integrity verification application can be designed to recognize change events and evaluate known good values, which allow evaluation of a boot-integrity stamp and a running process binary signature stamp based on, for example, TPM counters, timestamps, nonces, and/or time tokens. On any discrepancy, a controller or centralized device can isolate a compromised node from its network peers by shutting down the interfaces of the node.

In some examples, the metadata elements, e.g. canary stamps, and/or verifications for integrity can be implemented, such as a measured-boot stamp (e.g., SHA1 hash over PCRs 0-7), a verified-boot stamp (e.g., which can verify that only recognized binaries were executed when booting), a process-stamp (e.g., root-of-trust validated through a process which is asserting a particular protocol or protocols), a file-system stamp (e.g., all files within a vendor determined set of directories), a log-integrity stamp (e.g., used to augment existing integrity analytics and forensics), a configuration stamp (e.g., State of the current device configuration), etc. Some implementations can achieve all or some of these stamps, depending on the implementation. Moreover, in some implementations, all or some of these stamps can be implemented or achieved using a single or multiple stamps.

As previously explained, TPM provides methods for collecting and reporting the identity of hardware and software components in a platform to establish trust for that platform. TPM functionality can be embedded in a variety of devices including mobile phones, personal computers, network nodes (e.g., switches, routers, firewalls, servers, network appliances, etc.), and/or any other computing devices. Further, attestation can describe how the TPM can be used as a hardware root of trust and offer proof of integrity of a node. Such integrity can include hardware integrity, software integrity (e.g., micro loader, firmware, boot loader, kernel, operating system, binaries, files, etc.), and runtime integrity.

In some cases, TPM and attestation can be implemented as described herein to provide proof of integrity and proof of transit through uncompromised nodes. In some examples, metadata elements and tokens containing or reflecting security measures are used as previously mentioned to validate the integrity of a node and perform continuous evaluation of node integrity. Thus, the metadata elements and tokens described herein can be used to provide proof of transit through uncompromised nodes.

In some examples, the metadata elements and tokens can be added as additional metadata to packets that traverse a network where proof of transit via uncompromised nodes is desired. Various strategies can be implemented for transporting the metadata elements and tokens in a packet. In some cases, the metadata elements and tokens can be carried within an In-Situ (or in-band) Operations, Administration and Management (IOAM) data field.

In some implementations, the metadata elements and tokens can be carried with IOAM trace data. For example, a canary stamp can be carried as part of an IOAM data field in a variety of encapsulation protocols such as, for example and without limitation, IPv4, IPv6, NSH (Network Service Header), etc. In some cases, the canary stamp can be carried in an IOAM data field as an IOAM Trace option data element (e.g., with an IOAM Trace type for node integrity canary stamp). A metadata element, token, or digest, e.g. canary stamp digest, can be added in the IOAM trace option of a packet by each node that forwards the packet.

When the packet reaches a node (e.g., the destination node and/or an intermediate node) that removes IOAM metadata (e.g., an IOAM decapsulating node), the validity of the metadata element and/or token in the packet can be verified to determine that the packet traversed uncompromised nodes. In some examples, since canary stamps are time bound, the packet trace timestamps defined in IOAM can be used to validate the canary stamp in the time window the packet traversed that node.

Verification can be performed without placing a large transactional load on the verifier or a device, such as a controller, that will ultimately validate the security measurements associated with the metadata elements or tokens. This is because the measurement values can often change infrequently. The verifier may only need to validate a metadata element and/or token carried within an IOAM data trace whenever the associated security measurements associated change (e.g., a verifier may only need to check with a controller whenever it sees a node's TPM extends a PCR value which was not previously confirmed by the verifier).

In some cases, when only the time ticks within a signed metadata element increases, only the signature of the metadata element is validated. To do this, the verifier may use the public key of any node which can place a metadata element. Such signature validation can be done without using a controller to verify the measurements.

In another example, a packet can carry IOAM POT data with space optimization of metadata element values, e.g. canary stamp values. For example, a new IOAM POT data field can carry a canary stamp or a hash extend of a canary stamp and, in turn, canary stamp data can be carried across nodes. In some cases, a canary stamp hash extend can be a similar method as PCR extend operation performed by TPMs.

In some cases, the canary stamp hash can provide a one-way hash so that a canary stamp recorded by any node cannot be removed or modified without detection. IOAM proof of transit option data for a canary stamp digest can be defined by a hash algorithm (e.g., 20 octets with SHA1, 32 octets with SHA 256, etc.). In some implementations, each node along a path of the packet can forward the packet with a new or updated canary stamp digest. In some examples, the new or updated canary stamp digest can be generated by a node as follows: IOAM canary stamp digest new value=Digest of (IOAM canary stamp digest old value∥hash (canary stamp of the node)), where the IOAM canary stamp digest old value can refer to the canary stamp digest included in the packet by one or more previous hops.

Moreover, in some cases, a Per Packet Nonce (PPN), where PPN changes per packet and is carried as another field within the IOAM metadata option, can be added to provide robustness against replay attacks. To illustrate, in some examples, a PPN can be added as follows: IOAM canary stamp digest new value=Digest of (IOAM canary stamp digest old value∥hash(canary stamp of the node II PPN)). A node creating the new value for the IOAM canary stamp digest can thus take the value of any previous IOAM canary stamp digest and extend/hash that value with the node's current canary stamp. The result of the concatenation and hashing can then be written into IOAM POT data (or other IOAM data fields) as the new IOAM canary stamp digest.

At the verifier (e.g., the device verifying the canary stamp data), the same operation can be performed over expected canary stamp values calculated for the nodes that are traversed in the time window when the packet was forwarded. A verifier can be an inline device or a centralized device. Moreover, in some examples, nodes that are expected to be traversed can be identified using IOAM tracing, routing state or by sending active probes. A match between the value of POT data carrying specific metadata elements, e.g. a canary stamp digest and the expected canary stamp value, can prove that the packet traversed through trusted or uncompromised nodes.

In some examples, one or more strategies can be implemented to optimize metadata element validation. For example, metadata elements, e.g. canary stamps, can detect attempts of a replay attack by embedding a nonce as well as TPM or TPM2 counters (e.g., clock, reset, restart). In some cases, this nonce can be part of the metadata elements and different from the PPN described above.

The nonce is relevant to a receiver as the interval from the nonce's creation time to the first stamp received by the verifier can define the interval of freshness (e.g., the measurement is no older than this interval of freshness). From there, the TPM2 time ticks counter can be used to maintain that initial gap of freshness even without the delivery of a new nonce.

In some implementations, to optimize metadata element or token validation across nodes, the following approaches can be implemented to deliver synchronization information from a central component to each node and the verifier. For example, a central server can broadcast or multicast centralized nonce values (e.g., tracked random numbers). Each node can pick up the latest nonce and use it to attest a value. A verifier can know the freshness of a metadata element or token it receives from each node. This freshness can be the delta in time since that particular nonce was issued. Subsequent attestations can use the incrementing time ticks to prove freshness from that initial time gap. In some cases, the issuing of new nonces can reset the time gap to a potentially shorter interval.

Moreover, in some cases, each node can embed attested time within its metadata element. To get attested time, a TUDA (Time-Based Uni-Directional Attestation) scheme such as the TUDA scheme described in https://tools.ietforg/id/draft-birkholz-i2nsf-tuda-01.html, the contents of which are incorporated herein by reference in their entirety, can be used. This can result in the availability of both the attested time at a node, as well as the value of the TPM2 counters at this node when a TUDA time-synchronization token was created. This can eliminate the use of a central nonce authority, but can increase the size of the metadata element as the nonce can be replaced by the TUDA time-synchronization token. This approach may also implement a central timestamp authority as per TUDA. In some examples, for each hop, a canary stamp digest value can be: IOAM canary stamp digest new value=Digest of (IOAM canary stamp digest old value∥hash(canary stamp of the node II TUDA time-synchronization token of the node)).

This approach can provide numerous benefits. For example and without limitation, with this approach, a verifier can limit the number of verifications by verifying the signature of a hop's time-synchronization token only when it changes. Moreover, with this approach, there may not be a time gap nonce changeover freshness when a first measurement is received. Further, in some cases, this approach can be implemented without also carrying a PPN or without synchronizing a nonce across nodes as previously described.

Further, an attestor, e.g. a node or a verifier, can use random numbers, otherwise pseudo-random numbers, created by peers and/or the attestor to generate and verify attestation information. Specifically, the attestor can accumulate random numbers from one or more layer 2 peers. The random numbers can be accumulated from the peers over a specific amount of time, e.g. a short duration of time. In turn, the random numbers can be combined into a number through an applicable technique, e.g. a Bloom filter. This number can serve as a nonce for a cryptoprocessor for generating a result. As follows, the layer 2 peers, potentially including the attestor, can use the result created by the cryptoprocessor, to verify/validate that their corresponding provided random number was used in generating the nonce ultimately used by the cryptoprocessor to create the result. In turn, the layer 2 peers, potentially including the attestor, can generate verified attestation information based on the random numbers generated by the peers, the nonce created from the random numbers, and/or the result created by the cryptoprocessor from the nonce.

Having discussed canary stamps and other trust-related concepts, this disclosure now returns to the discussion of handling trust issues in networks. On-demand based network protocols and architectures (such as locator ID separation protocol (LISP) and ILAMP protocols defined in the Internet Engineering Task Force (IETF) or the just-in-time architecture used in the Streamline infrastructure) can take advantage of these attestation techniques. An ILAMP protocol (ILA (Identifier Locator Addressing) Mapping Protocol) is a mapping used between forwarding nodes and routers to manage the cache. The ILA provides an approach to implement network overlays without the overhead, complexities, or anchor points associated with encapsulation. The solution facilitates highly efficient packet forwarding and provides low latency and scalability in mobile networks. ILA can be used in conjunction with techniques such as network slices and Network Function Virtualization to achieve optimal service based forwarding.

In particular, the on-demand based network protocols and architectures can use them to 1) assign levels of trust to the different sources of information in the network and 2) during on-demand procedures use of these levels of trust to dynamically drive the policy to be followed during request processing. The present disclosure also proposes a set of mechanisms to be used in on-demand systems to support trust-level tracking based on unidirectional attestation and trust-driven dynamic resolution of policies.

Figure 3:
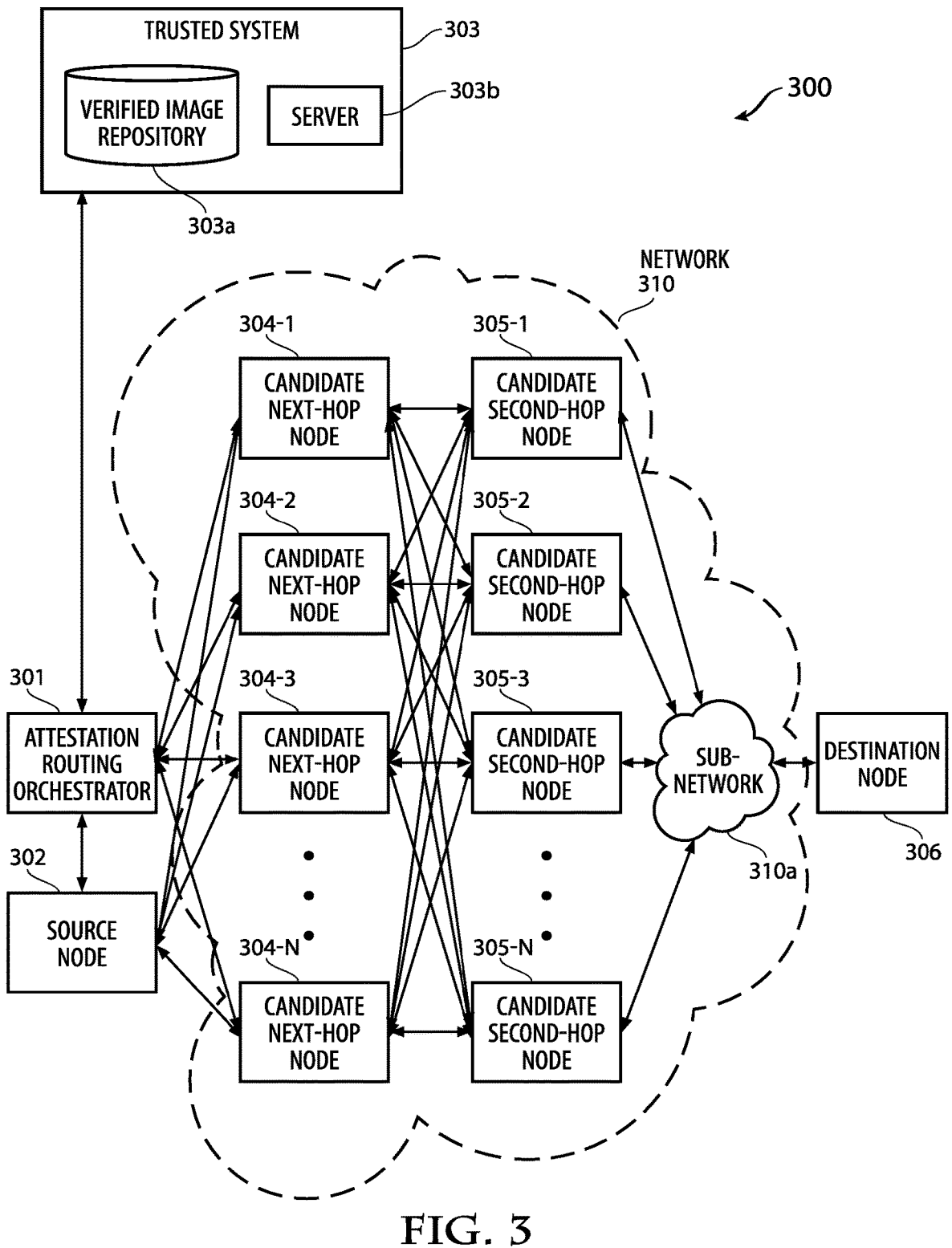
FIG. 3 is a block diagram of an example of a networking environment in accordance with some implementations.

FIG. 3 is a block diagram of an example of a networking environment 300 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the first example of the networking environment 300 includes a network 310 that includes a sub-network 310a. In some implementations, the sub-network 310a corresponds to a local area network (LAN) or virtual local area network (VLAN). In some implementations, the sub-network 310a corresponds to a wide area network (WAN), such as the Internet. The sub-network 310a can include a combination of nodes included within a LAN, VLAN, and/or WAN.

The networking environment 300 further includes a source node 302. The source node 302 corresponds to a networking device (e.g., switch, router, gateway, etc.) associated with a data packet that is destined for a destination node 306. The source node 302 is coupled to a plurality of candidate next-hop nodes 304-1-304-N. Each of the plurality of candidate next-hop nodes 304-1-304-N is included within a respective route between the source node 302 and the destination node 306. As illustrated in FIG. 3, each of the plurality of candidate next-hop nodes 304-1-304-N is connected to candidate second hop nodes 305-1-305M. One of ordinary skill in the art will appreciate that, in various implementations, each of the plurality of candidate next-hop nodes 304-1-304-N is connected to a subset of the candidate second hop nodes 305-1-305M (not shown).

The networking environment 300 further includes an attestation routing orchestrator 301. As with the source node 302, the attestation routing orchestrator 301 is coupled to the plurality of candidate next-hop nodes 304-1-304-N. In various implementations, the attestation routing orchestrator 301 obtains, according to a predefined protocol, a first plurality of attestation vectors from the candidate next-hop nodes 304-1-304-N. In one aspect, the attestation routing orchestrator 301 further obtains additional information from candidate second-hop nodes 305-1-305-M and utilizes the additional information in selecting the particular candidate next-hop node. Although not illustrated in FIG. 3, the attestation routing orchestrator 301 further can obtain additional information from nodes that are more than two hops away (e.g., candidate third hop nodes, candidate fourth hop nodes, etc.).

The attestation routing orchestrator 301 is further coupled to a trusted system 303. The attestation routing orchestrator 301 can obtain a trusted image vector from the trusted system 303. The trusted system 303 includes a verified image repository 303a and a server 303b. The trusted system 303 can include one or more trusted image vectors that are known with a high degree of confidence to have not been compromised (e.g., hacked, attacked, improperly accessed, etc.). For example, in some implementations, the trusted system 303 can be part of a stub network.

As will be described in great detail with reference to FIG. 4, the attestation routing orchestrator 301 selects, and directs a data packet to, a particular candidate next-hop node of the plurality of candidate next-hop nodes 304-1-304-N based on the trusted image vector and the first plurality of attestation vectors. Moreover, the attestation routing orchestrator 301 directs the data packet destined for the destination node 306 to the particular candidate next-hop node.

Figure 4:
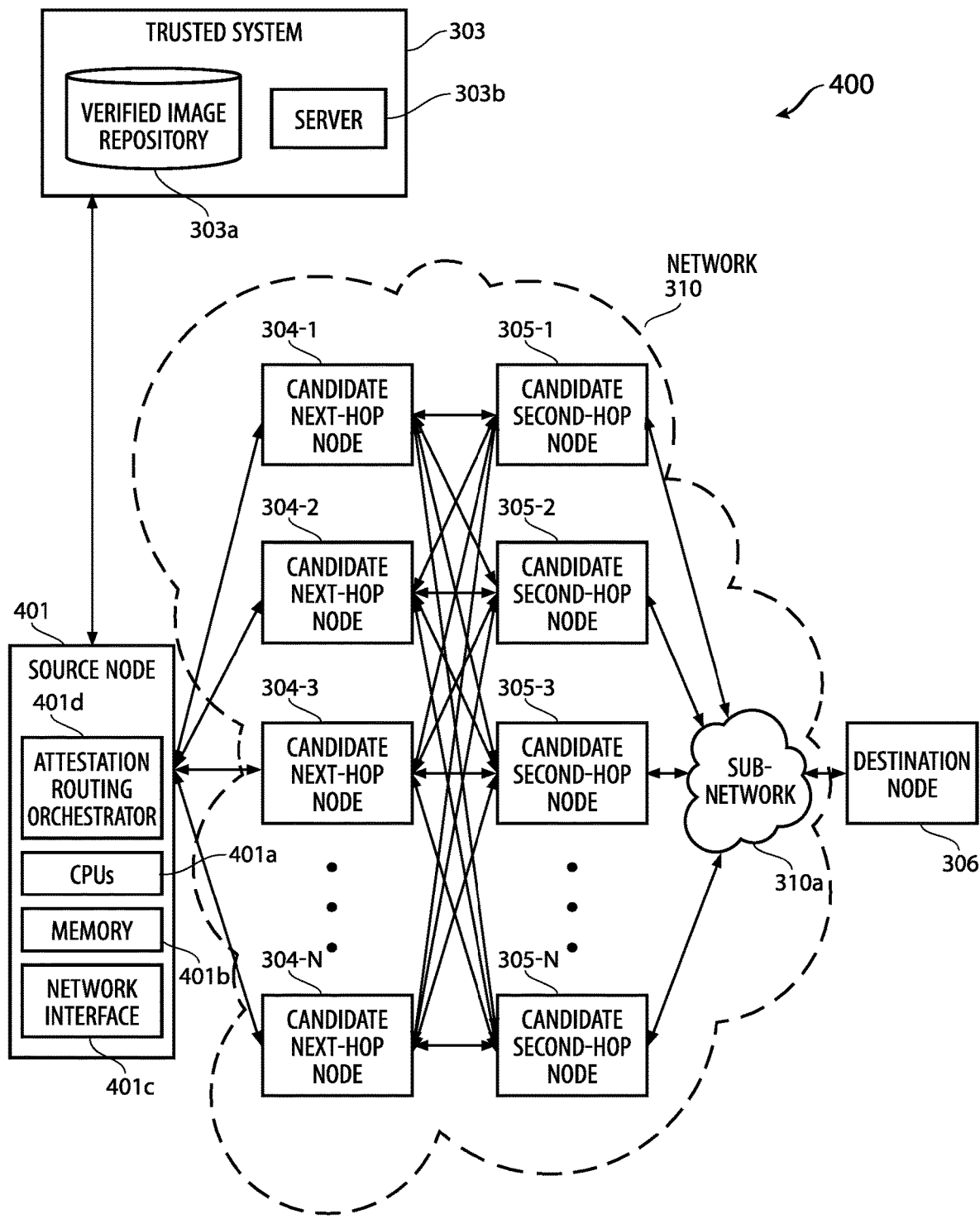
FIG. 4 is a block diagram of an example of a networking environment in accordance with some implementations.

FIG. 4 is a block diagram of an example of a networking environment 400 in accordance with some implementations. Notably, in contrast to the networking environment 300 illustrated in FIG. 3, the networking environment 400 includes a source node 401 that includes an attestation routing orchestrator 401d. The attestation routing orchestrator 401d can be similar to and adapted from the attestation routing orchestrator 301 in FIG. 3.

The source node 401 further includes one or more CPUs 401a. In various implementations, the one or more CPUs 401a provide processing resources for generating a plurality of confidence scores for the corresponding plurality of candidate next-hop nodes 304-1-304-N. The one or more CPUs 401a can provide processing resources for selecting a particular confidence score of the plurality of confidence scores that satisfies one or more selection criteria. A more detailed description of these features is provided with reference to FIG. 5, below.

The source node 401 further includes a memory 401b. The memory 401b can correspond to a non-transitory memory, such as RAM, ROM, etc. The memory 401b can store the data packet destined for the destination node 306. In some implementations, the memory 401b stores a trusted image vector obtained from the trusted system 303. The memory 401b can store a first plurality of attestation vectors obtained from the corresponding plurality of candidate next-hop nodes 304-1-304-N and optionally a second plurality of attestation vectors obtained from the corresponding plurality of candidate second hop nodes 305-1-305-M. The source node 401 further can include a network interface 401c for obtaining, receiving, and transmitting the aforementioned data packets and vectors.

As will be further described with reference to FIG. 5, the source node 401 can select, and directs a data packet to, a particular candidate next-hop node based the trusted image vector and the first plurality of attestation vectors.

Figure 5:
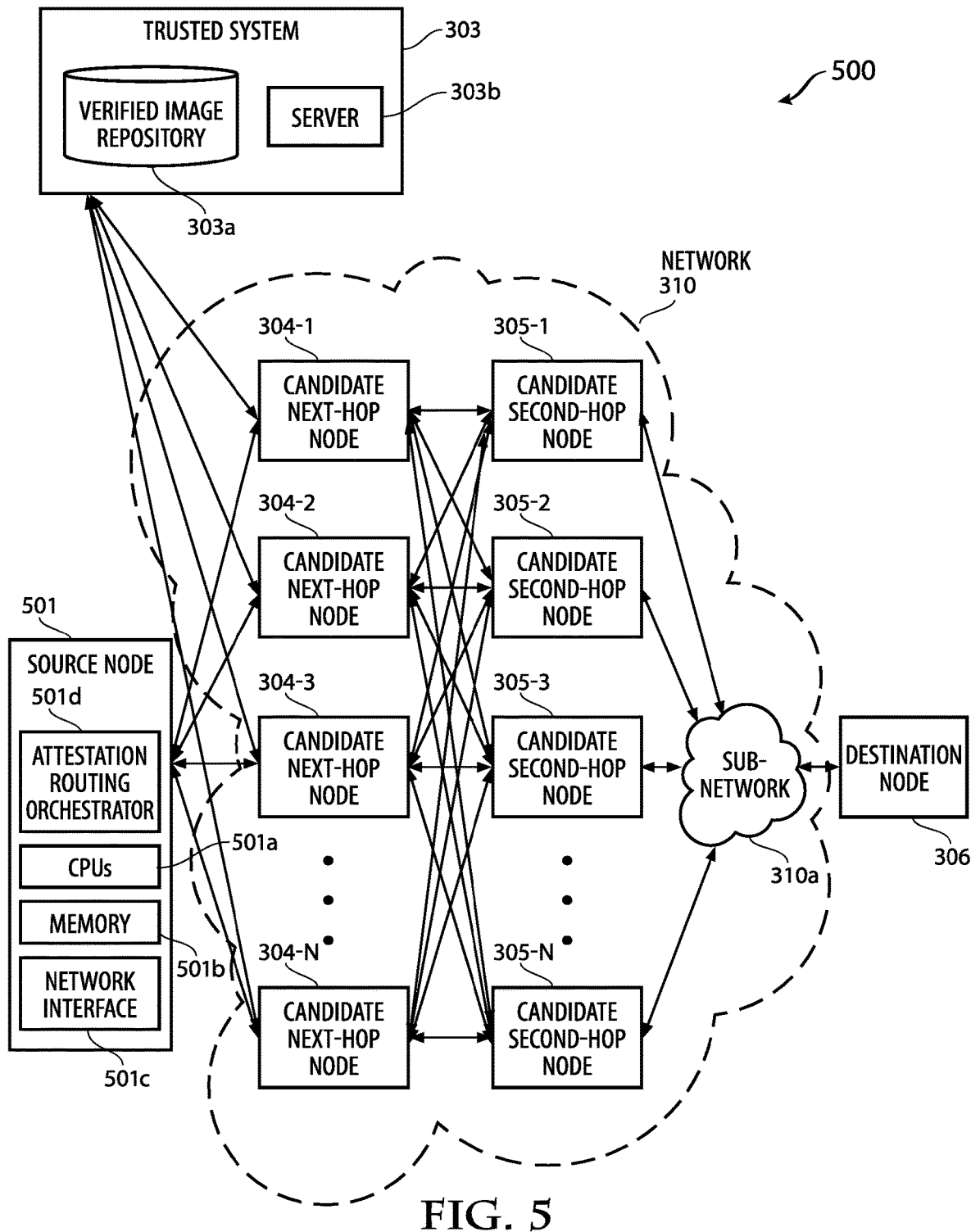
FIG. 5 is a block diagram of an example of a networking environment in accordance with some implementations.

FIG. 5 is a block diagram 500 of an example of a networking environment 500 in accordance with some implementations. Notably, in contrast to the networking environment 400 illustrated in FIG. 4 and the networking environment 300 in FIG. 3, in the networking environment 500, a particular one of the plurality of candidate next-hop nodes 304-1-304-N relays a trusted image vector from the trusted system 303 to the source node 501. In various implementations, the attestation routing orchestrator 501d is similar to and adapted from the attestation routing orchestrator 401 in FIG. 4 and/or the attestation routing orchestrator 301d in FIG. 3.

The trusted system 303 can sign the trusted image vector and provide the signed trusted image vector to the particular candidate next hop node, which in turn provides the signed trusted image vector to the source node 501. The particular candidate next hop node provide the signed trusted image vector reduces attestation time (e.g., the time to determine trustworthiness of the particular candidate next hop node) because the source node 501 need not contact a remote node (trusted system 303). In some implementations, attestation time is further reduced because a single attestation process (e.g., the trusted system 303 signing the trusted image vector) facilitates the attesting of multiple source nodes. In other words, trusted image vectors need not be generated and evaluated on a per source node basis. Moreover, in implementations in which the source node 501 is not connected to the trusted system 303 (e.g., link down), obtaining the trusted image vector from the particular candidate next hop provides an alternative mechanism for node attestation. In some implementations, the trusted system 303 appends a time-stamped response to the trusted image vector as part of the signing process, sometimes referred to as stapling. Consequently, the source node 501 need not contact the trusted system 103 in order to attest a particular candidate next hop node.

Figure 6:
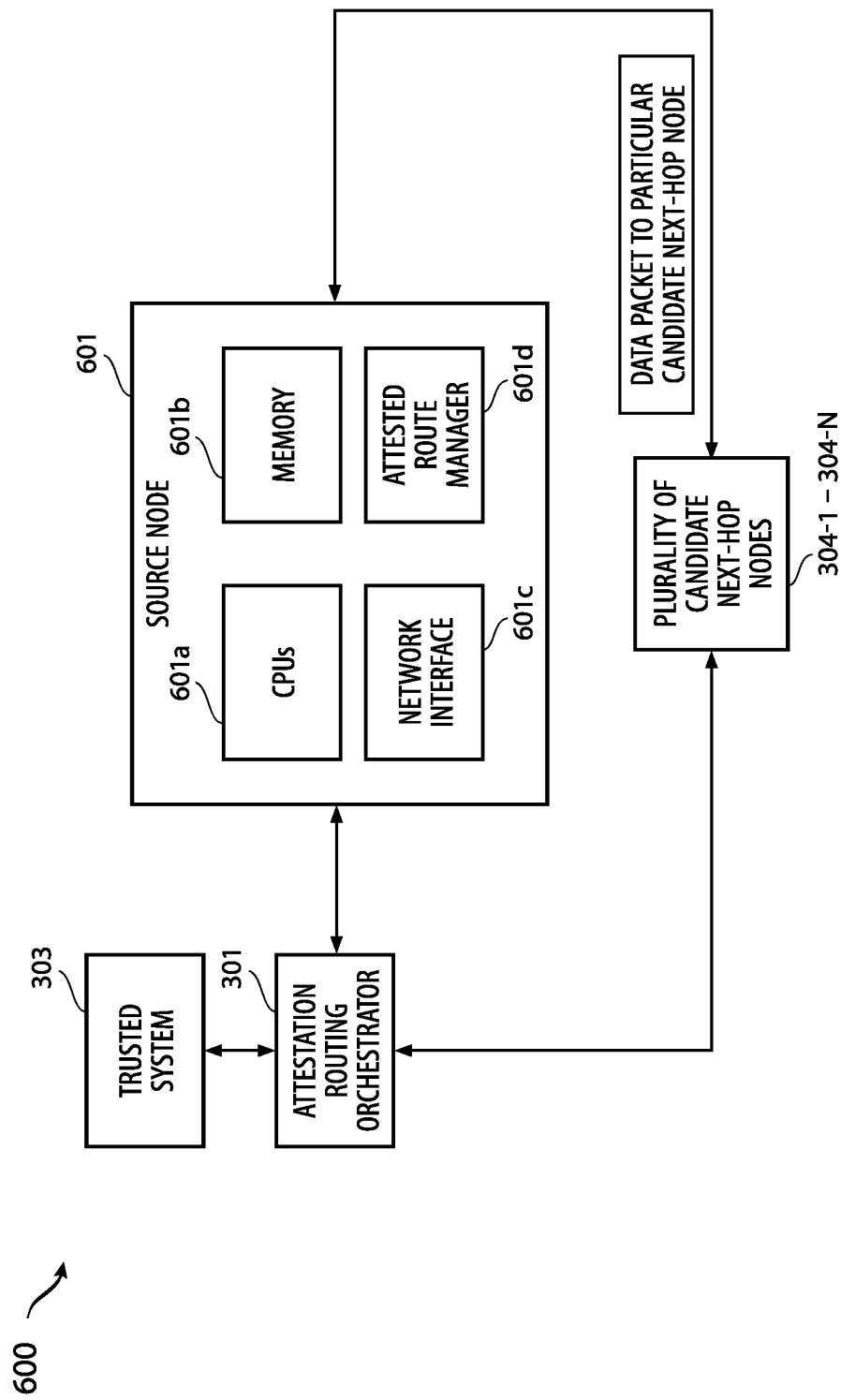
FIG. 6 is a block diagram of controller orchestrated attestation based routing in accordance with some implementations.

FIG. 6 is an example block diagram of a controller orchestrated attestation based routing system 600. The source node 601 can be similar to and adapted from the source node 302 in FIG. 3. As illustrated in FIG. 6, the attestation routing orchestrator 301 is separate from but coupled (e.g., connected) to the source node 601. The attestation routing orchestrator 301 corresponds to a controller with knowledge of the network that includes the plurality of candidate next-hop nodes and optionally the plurality of candidate second-hop nodes. For example, the attestation routing orchestrator 301 corresponds to a network management system (NMS). As another example, the attestation routing orchestrator 301 corresponds to an intent-based networking system, such as Cisco's digital network architecture (DNA). As yet another example, in some implementations, the attestation routing orchestrator 301 corresponds to a wireless LAN controller (WLC), while the plurality of candidate next-hop nodes 304-1-304-N and optionally the plurality of candidate second hop nodes correspond to networking devices (e.g., access points, user devices, etc.)

The attestation routing orchestrator 301 obtains, according to a predefined protocol, a first plurality of attestation vectors from the plurality of candidate next-hop nodes 304-1-304-N. Each of the plurality of candidate next-hop nodes 304-1-304-N is included within a respective route between the source node 601 and a destination node. In various implementations, the respective routes are independent of each other.

The attestation routing orchestrator 301 determines a plurality of confidence scores. Each of the plurality of confidence scores is based on a comparison between a corresponding one of the first plurality of attestation vectors and a trusted image vector. In various implementations, the attestation routing orchestrator 301 obtains the trusted image vector from the trusted system 303.

The attestation routing orchestrator 301 can obtain, according to the predefined protocol, a second plurality of attestation vectors from a corresponding plurality of candidate second-hop nodes. Each of the plurality of candidate second-hop nodes is included within a respective route between a corresponding one of the plurality of candidate next-hop nodes 304-1-304-N and the destination node. Each of the plurality of confidence scores can be additionally based on a comparison between a corresponding one of the second plurality of attention vectors and the trusted image vector in combination with the comparison between the corresponding one of the first plurality of attestation vectors and the trusted image vector.

The attestation routing orchestrator 301 selects, from the plurality of confidence scores, a particular confidence score that satisfies one or more selection criteria. The particular confidence score is associated with a particular candidate next-hop node of the plurality of candidate next-hop nodes 304-1-304-N.

The attestation routing orchestrator 301 directs, to the particular candidate next-hop node, a data packet destined for the destination node. For example, in various implementations, the attestation routing orchestrator 301 provides attested route information to an attested route manager 601d of the source node 601 in order to facilitate the source node 601 sending the data packet to the particular candidate next-hop node. The attested route information is indicative of the trustworthiness of each of the plurality of candidate next-hop nodes 304-1-304-N.

For example, the attested route information can include an identifier (e.g., IP address, MAC address, SSID, etc.) identifying a secure, particular candidate next-hop node of the plurality of candidate next-hop nodes 304-1-304-N. In this example, the source node 601 provides the data packet based on the identifier in order to route the data packet to the secure, particular candidate next-hop node.

As another example, the attested route information can include a plurality of confidence scores associated with the plurality of candidate next-hop nodes 304-1-304-N. The determination of confidence scores will be described in further detail, below. In this example, the attested route manager 601d selects a particular candidate score based on one or more selection criteria, which also be described in further detail, below. Moreover, the attested route manger 601d provides the data packet to the particular next-hop node associated with the particular candidate score. The attestation routing orchestrator 301 can cease to direct additional data packets to the particular candidate next-hop node in response to determining that the particular confidence score falls below a confidence threshold.

The source node 601 can include one or more CPUs 601a. In various implementations, the one or more CPUs 601a provide processing resources for managing attested route information obtained from the attestation routing orchestrator 301. The source node 601 further includes a memory 601b. The memory 601b can correspond to a non-transitory memory, such as RAM, ROM, etc. The memory 601b can store the obtained attested route information and data packets to be transmitted. The source node 601 further includes a network interface 601c for obtaining the attested route information.

Determination of whether a network device has been compromised or not is a function of available/visible indicators associated with the network device and time. The visible indicators include, but are not limited to, a set of currently available evidence footprints which indicate a compromise may be in place on a particular remote device. Such indicators can come from multiple sources, including from TPM/Aikido, canary stamps, Syslog, YANG Push, EEM, peer devices, traffic counters, and other sources. Visibility can be a preferred method of identifying a compromise, as it is easier to react to the compromise in a timely manner. These indicators may be referred to as visible indicators.

When there are no visible indicators (i.e., no visible footprints available), the probability of a remote device compromise is a function of the time which has passed since the last validation that the device is in a known good state. Time can be a less preferable method compared to visibility method described above, as there will be a lag before any remediation might be applied. These indicator(s) may be referred to as invisible and/or time indicators.

With the above two categories of visible/invisible indicators, an instantaneous formula can be provided for estimating probability or chance of a compromise on any given device operating within a network.

For visible factors/indicators: Pv1 can be defined as probability for compromise of type 1 when there is a specific set of events/signatures existing which correspond to the compromise. Pv2 can be defined as probability for compromise of type 2 and Pvx can be defined as probability for compromise of type x. Assuming each of these compromises Pv1 . . . Pvx are independent, the following formula gives the probability of visible compromise based on recognized signatures (Pv):

$$Pv=1-((1-Pv1)(1-Pv2) \ldots (1-Pvx)) \quad (1)$$

Other type of known or to be developed formulas may be used instead of or in conjunction with formula (1) when there are interdependencies between different types of evaluated compromises (Pv1, Pv2, . . . Pvx).

Furthermore, any given probability (e.g., Pv1 . . . Pvx) may be determined based on evidences of events from that device for which the probability of a compromise is being calculated (e.g., via formula (1)) and/or evidence obtained from one or more devices adjacent to the device for which the probability of a compromise is being calculated (e.g., via formula (1)).

For invisible/time factors/indicators, a probability that an invisible compromise has occurred to a remote device in the deployment environment can be expressed by the formula:

$$Pi=1-((1-\text{chance of invisible compromise in time period } t)^{\text{number of } t \text{ intervals since last verification of a good/uncompromised remote system state}}) \quad (2)$$

Effectively knowing Pi implies that on operator knows the half-life which should be expected before a remote device should be considered compromised independently of any concrete evidence. It should be noted that a probability of an invisible compromise does not have to be static. Real time modification based on current knowledge of viruses/attacks may be allowed With formulates for visible and invisible factors as described above (formula (1) and formula (2)), an overall probability of a compromise for a given device may be given by $$Pc=1-((1-Pv)*(1-Pi)) \quad (3)$$

Formula (3) provides an indicator of trustworthiness (safety) of a given device. This metric considers both time based entropy and any available evidence which can be correlated to known compromises.

If Pc can be calculated (or even roughly estimated), various costly functions can be efficiently prioritized. For example, a controller may schedule when to do deeper validation (or perhaps direct refresh) of a remote device. This scheduling could include determining when to perform active checks to validate remote device memory locations (locations perhaps containing executable code which might have been compromised). These can be used to return the system to a known good state (and reset the entropy timer). Local configuration repositories can be refreshed based on evidence of security/trustworthiness issues underway, rather than being based just on time. Beyond the scheduling of system checks, there can be forwarding implications based on the value of Pc. For example, routing/switching behavior might be adjusted/impacted based on the relative trustworthiness of a remote device. Where a higher Pc values exist, sensitive data traffic flows can be routed around that device.

As a further advantage of the present disclosure, it should be noted that encryption alone may be insufficient to protect sensitive flows since there are scenarios where even the fact that a flow is occurring between endpoints might be considered information to be protected (e.g., in a battlefield).

Figure 7:
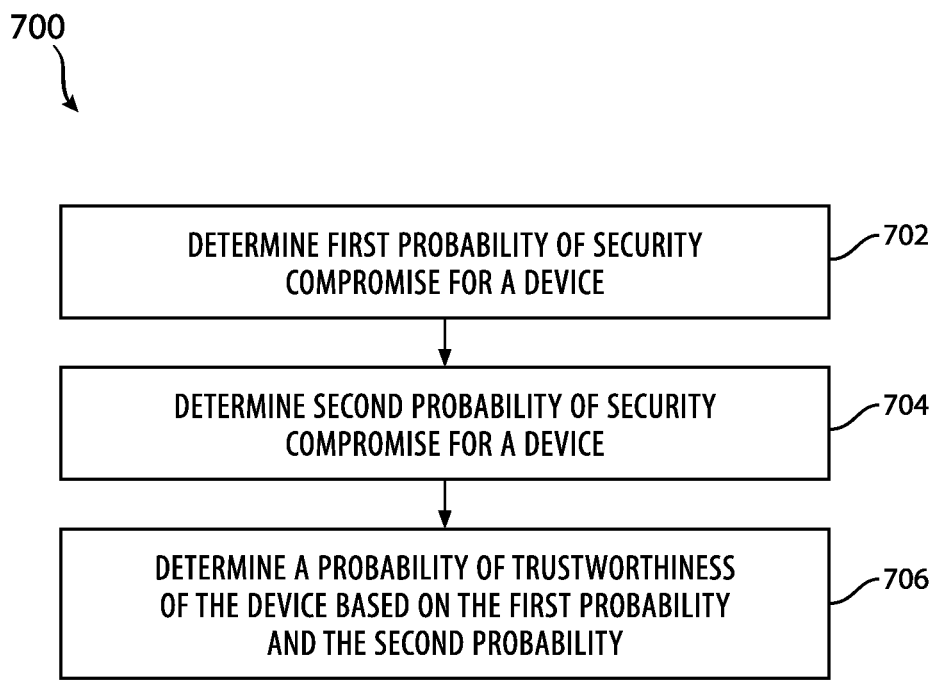
FIG. 7 is an example method of determining a device trustworthiness in accordance with some implementations.

FIG. 7 is an example method of determining a device trustworthiness in accordance with some implementations. While FIG. 7 will be described from a perspective of a network controller such as attestation routing orchestrator 301 of FIG. 6, it should be noted that such controller may have one or more memories having computer-readable instructions stored therein, which when executed by one or more associated processors, configure the controller to perform the steps of FIG. 7.

At step 702, a controller may determine a first probability of a security compromise for a given network device such as any one of source node 302/401, destination node 306 and/or any one of candidate next-hop nodes 304-1 to 304-N and any one or more of candidate second-hop nodes 305-1 to 305-N. Such first probability may be determined according to formula (1) as described above.

At step 704, the controller may determine a second probability of a security compromise for the given network device such as any one of source node 302/401, destination node 306 and/or any one of candidate next-hop nodes 304-1 to 304-N and any one or more of candidate second-hop nodes 305-1 to 305-N. Such first probability may be determined according to formula (2) as described above.

At step 706, the controller may determine, based on the first probability and the second probability, a probability of trustworthiness of the device according to formula (3) as described above.

Figure 8:
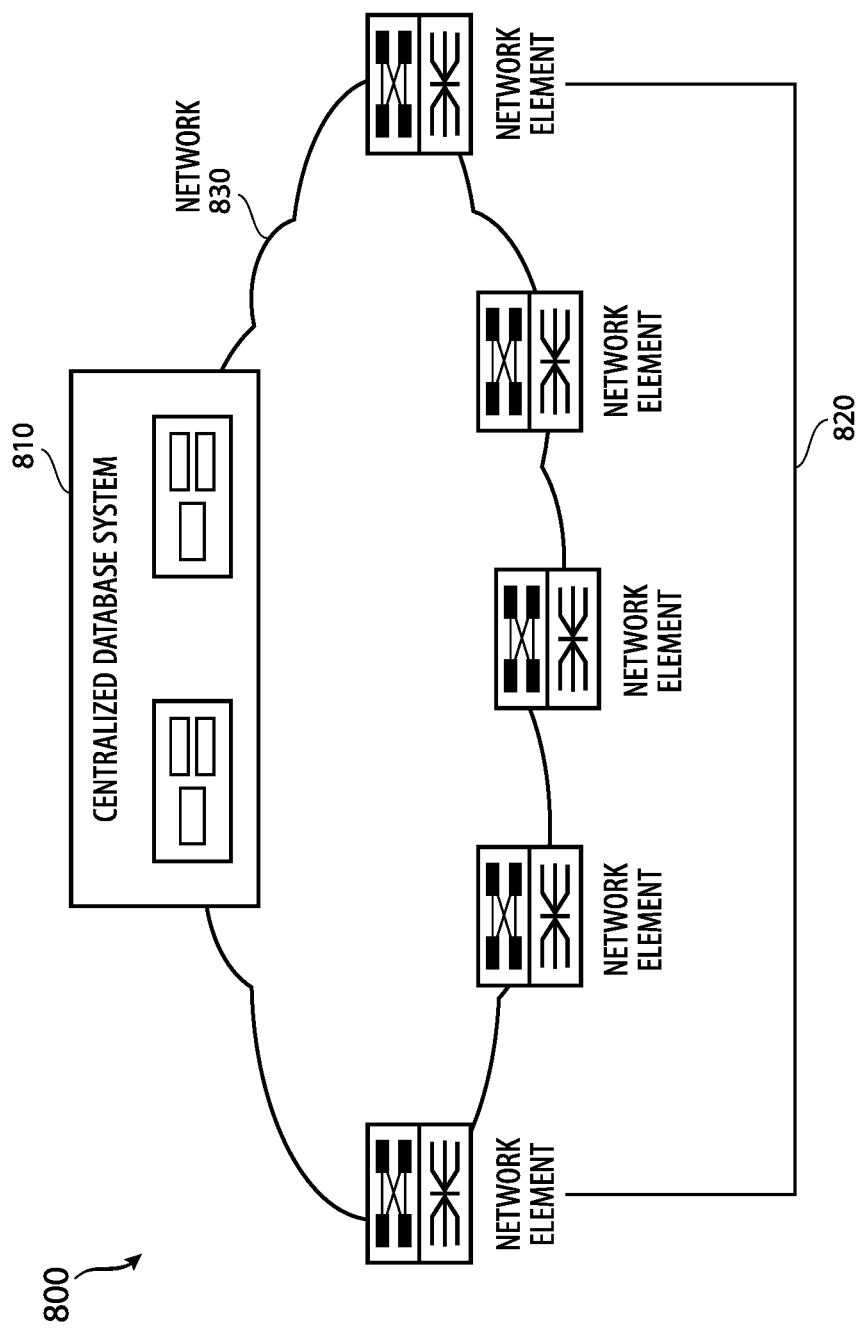
FIG. 8 illustrates an exemplary common architecture for an on-demand networking solution.

FIG. 8 illustrates an exemplary common architecture 800 for an on-demand networking solution. In this exemplary form, the on-demand network architecture can support two types of entities. The first is a centralized database system 810. The centralized database system stores information about the on-demand network 830 that can be queried (on demand) to support the dissemination of information.

The common architecture 800 also includes network elements 820. The network elements 820 participate in the network 830 and implement the routing and network services. The network elements 820 use the centralized database system to store and gather information about the on the network 830.

The two basic elements of the architecture must support two basic procedures to participate in a network deployment. First, the network elements 820 use a process to upload information to the centralized database 810. The other procedure is the on-demand requests by which the network elements 820 use to discover on-demand information about the network 830. For example, such information may include routing information within the network 830. Protocols such as LISP and ILAMP and architectures like Just-in-Time can follow this exemplary architecture as illustrated in the figure and described above.

Figure 9A:
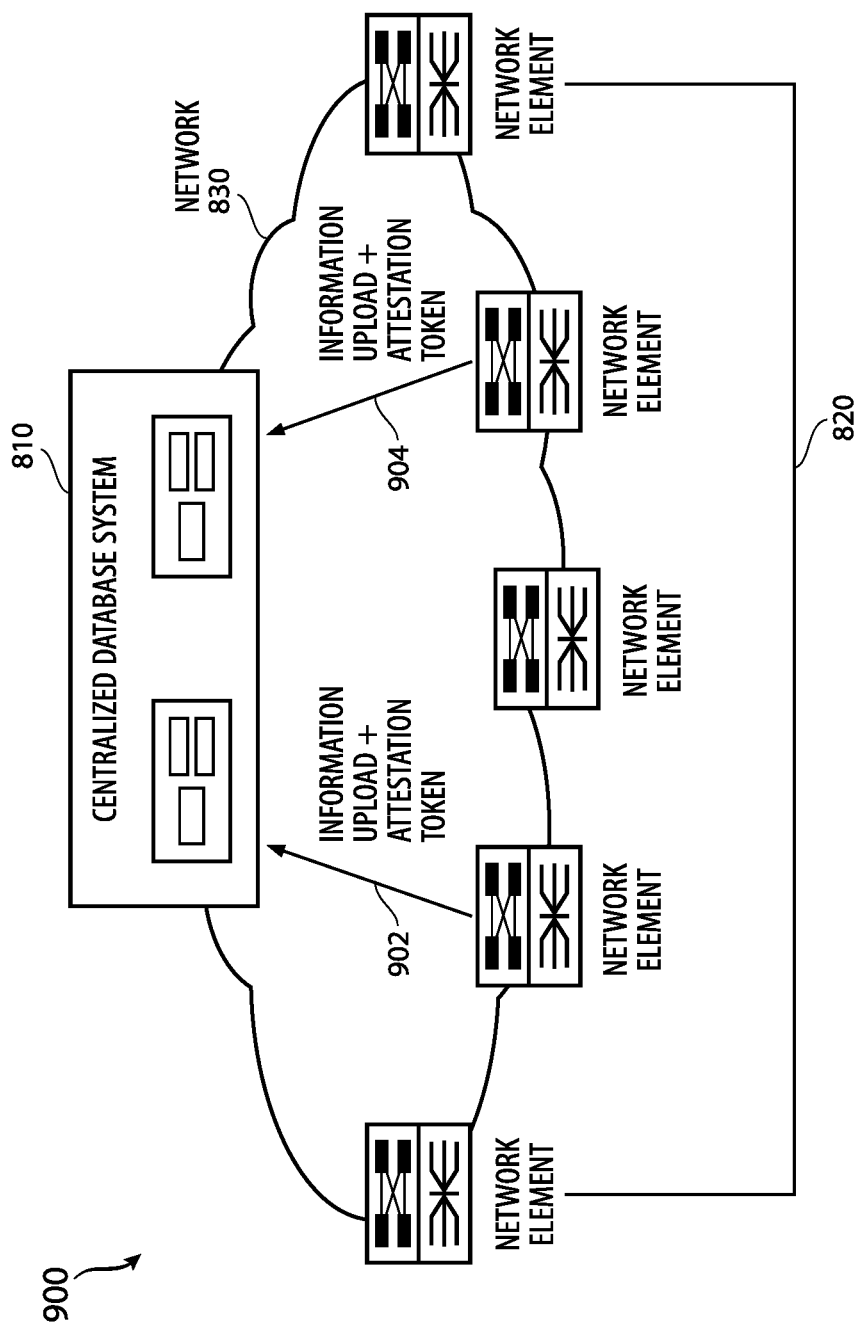
FIG. 9A and FIG. 9B illustrate a use of trust-level in connection with the on-demand networking solution in accordance with some implementations.
Figure 9B:
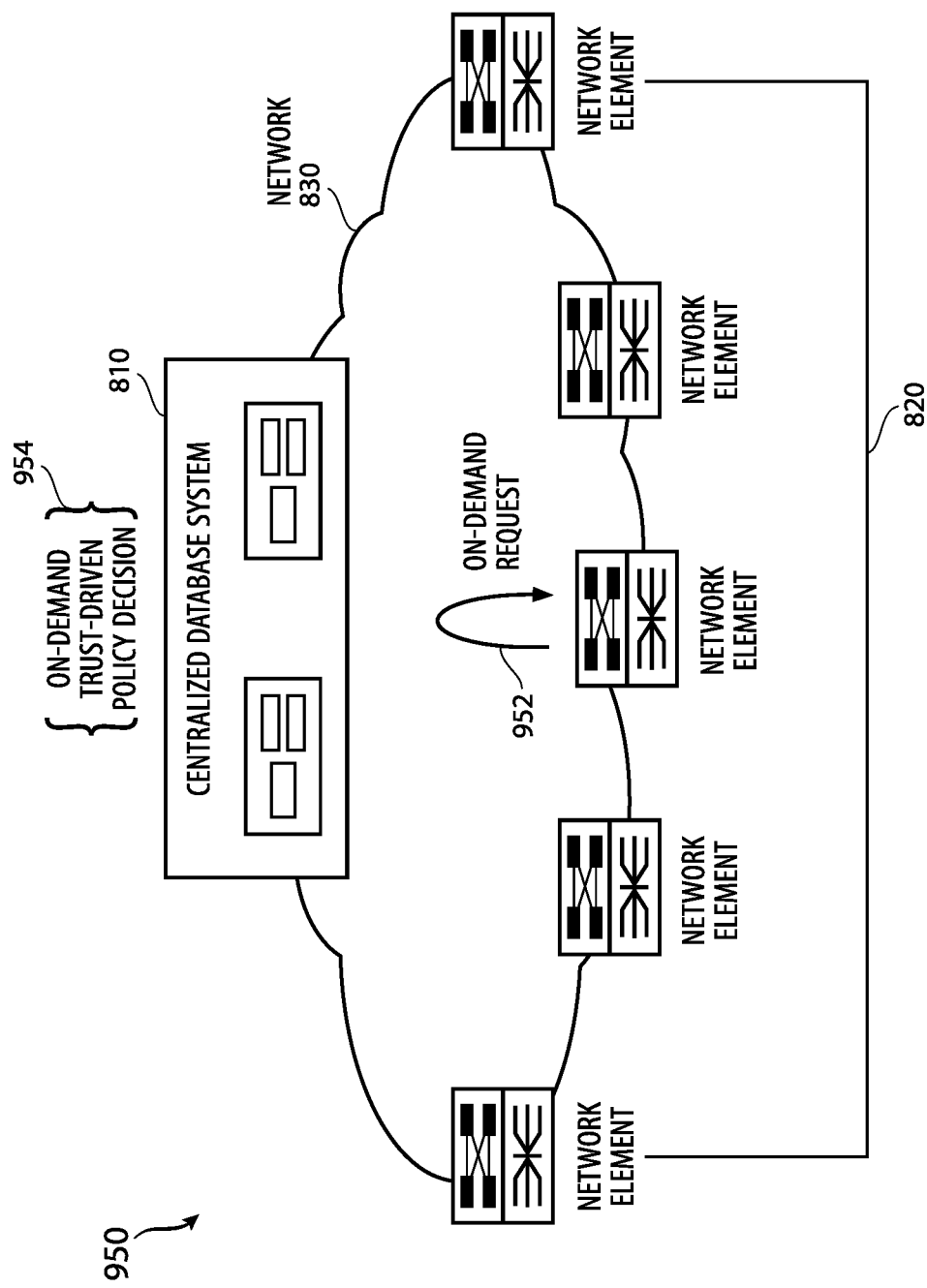

FIG. 9A and FIG. 9B illustrate a use of trust-level in connection with the on-demand networking solution in accordance with some implementations. The present application for using the trust-level in connection with the following mechanisms. First, network elements can use unidirectional attestation procedures coupled with the information upload events to the centralized database used in on-demand solutions. Next, the centralized system 810 uses attestation verification to maintain a level of trust categorization of the network elements. Trust level continuously degrades as time passes since the last attestation verification. Last, the on-demand resolution procedures are then subject to a time-based policy enforcement that depends on the state of trust at that particular point in time (degradation) for each one of the network elements involved in the on-demand process. Further details are provided below in connection with: (1) how attestation can be used during uploads and trust levels are maintained and may degrade with time, and (2) how trust-levels of both a requestor and receiver can be used to drive policy enforcement during on-demand resolution.

With respect to FIG. 9A, the figure illustrates information upload procedures that are leveraged to carry unidirectional attestation information (e.g. a canary stamp) so that the centralized mapping system 810 can ascertain trustworthiness of the source of the data 820. First with respect to the attestation with uploads, every information upload procedure is used as an attestation procedure 902, 904 and represent timely recordings of assessment of authenticity at the centralized database system 810.

Second, with respect to trust-level degradation, network elements that produce frequent information uploads 820 revalidate trust frequently. On the contrary, if a network element does not re-validate its attestations with the centralized database periodically, that may degrade its trust level. Similarly, during periods of low upload activity (no mobility, no new hosts, downtime, etc.) the centralized database 810 may consider degrade the level of trust associated to a particular network element in the network 830. Verification failures also degrade the level of trust.

Last, with respect to attestation refresh, when the centralized database 810 identifies that the trust-level of a node is degrading it has the possibility to request an information refresh, that request will be coupled with an attestation procedure. It is important to note here that following the above considerations, the trust-level of network elements becomes a time-dependent variable. Any policy that takes the trust-level into account automatically becomes a time-dependent function.

With respect to FIG. 9B, once the centralized database system 810 maintains a trust level score associated with every network element, on-demand procedures can follow trust-level policies 954 that take into account the level of trust of both the requestor as well as of the destination of the request taking into account the trust degradation at the time of the request. The important observation here is that since trust level has become a time dependent variable, policy application automatically becomes a dynamic process 952 that automatically adjusts to the level of trust of the elements involved. The overall system is shown as feature 950. The following figure (e.g. FIG. 10) illustrates this concept.

Figure 10:
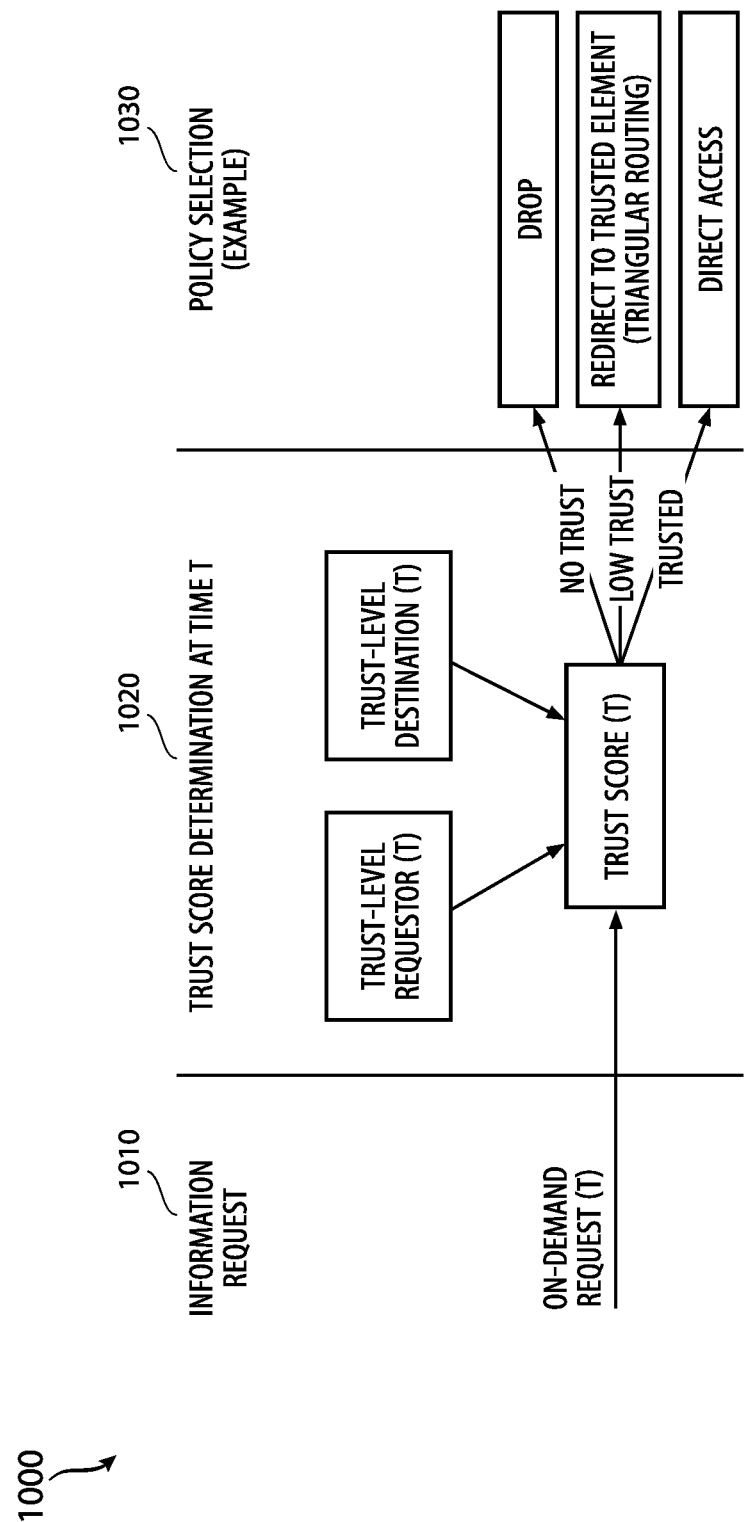
FIG. 10 illustrates an exemplary process to determine what trust policy to apply based on the level of trust.

FIG. 10 illustrates an exemplary process 1000 to determine what trust policy to apply based on the level of trust. The figure illustrates the process to determine to policy to apply at the centralized database system 810 based on the level of trust assigned to both the requestor of the information as well as the destination of the request (e.g. the producer of the information). The figure illustrates this idea by using three exemplary policy outcomes based on three exemplary levels of resulting combined trust.

As the figure illustrates, the instant when the on-demand request is transmitted and reaches the centralized database in step 1010, the centralized database can evaluate the received trust-level in step 1020 in order to determine the specific policy that is applied in step 1030. Applying the policy can include dropping the communication where there is little or no trust, redirecting to a trusted element for a medium or low level of trust, or providing direct access where the system has a high level of trust. As described above, the fact that trust-levels become a time-dependent value leads to having policies that dynamically track the trust score attributed to the different elements of the on-demand network.

Figure 11:
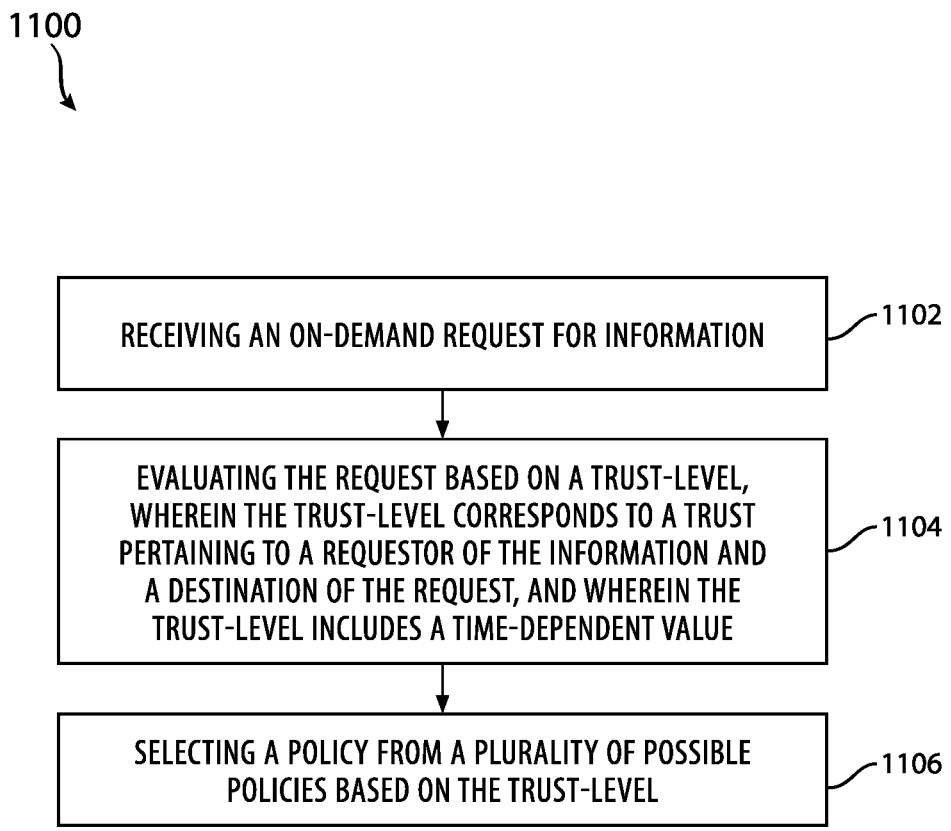
FIG. 11 illustrate an example method.

FIG. 11 illustrates a method example 1100 of implementing the policies. An example method includes receiving an on-demand request for information (1102), evaluating the request based on a trust-level, wherein the trust-level corresponds to a trust pertaining to a requestor of the information and a destination of the request, and wherein the trust-level includes a time-dependent value (1104) and selecting a policy from a plurality of possible policies based on the trust-level (1106).

Figure 12:
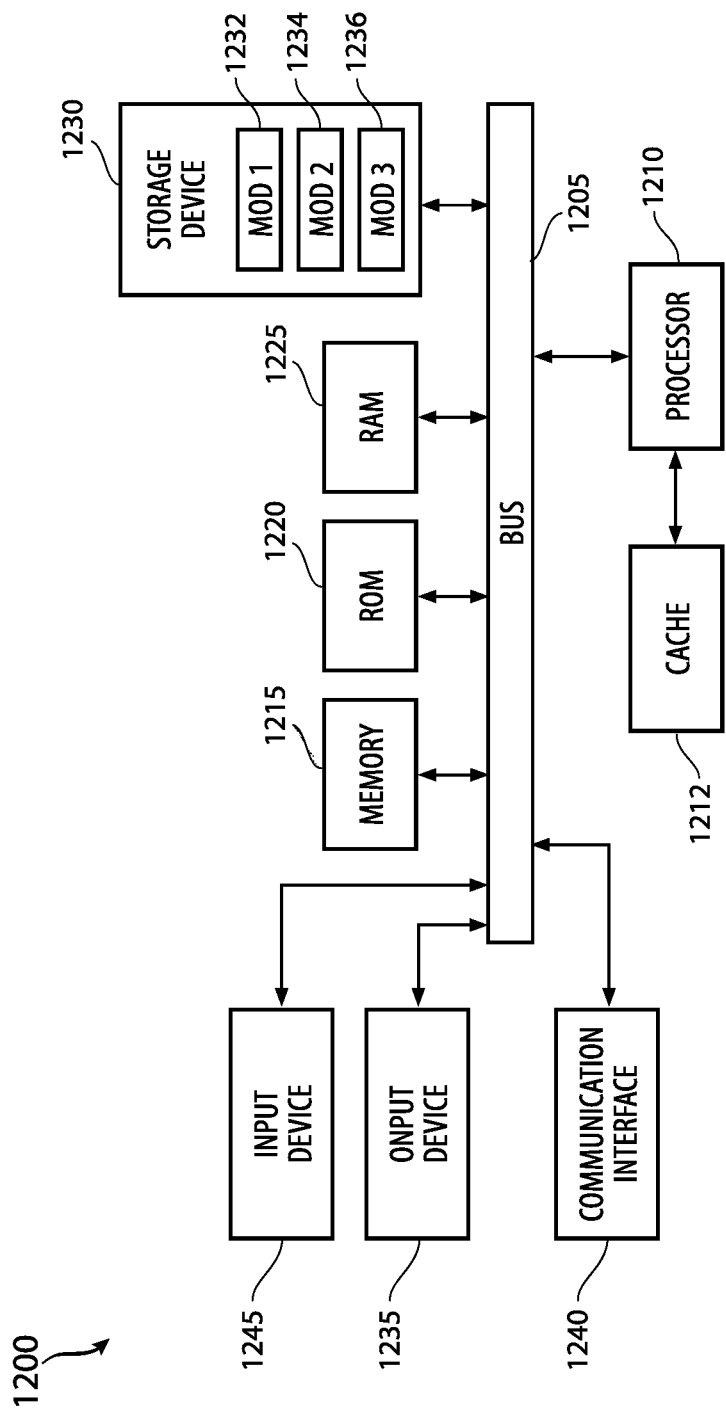
FIG. 12 illustrates an example network device architecture, in accordance with some implementations.
Figure 13:
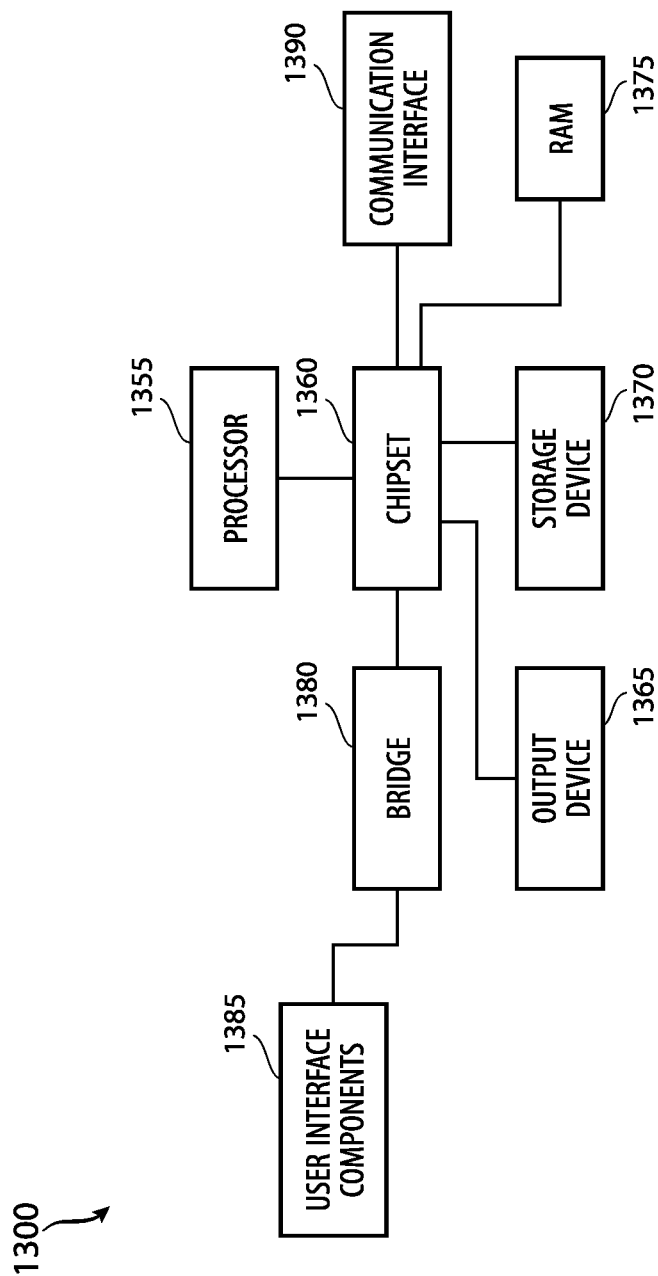
FIG. 13 illustrates a system architecture, in accordance with some implementations.

FIG. 12 and FIG. 13 illustrate systems in accordance with various embodiments. The more appropriate system will be apparent to those of ordinary skill in the art when practicing the various embodiments. Persons of ordinary skill in the art will also readily appreciate that other systems are possible.

FIG. 12 illustrates an example of a bus computing system 1200 wherein the components of the system are in electrical communication with each other using a bus 1205. The computing system 1200 can include a processing unit (CPU or processor) 1210 and a system bus 1205 that may couple various system components including the system memory 1215, such as read only memory (ROM) 1220 and random access memory (RAM) 1225, to the processor 1210. The computing system 1200 can include a cache 1212 of high-speed memory connected directly with, in close proximity to, or integrated as part of the processor 1210. The computing system 1200 can copy data from the memory 1215, ROM 1220, RAM 1225, and/or storage device 1230 to the cache 1212 for quick access by the processor 1210. In this way, the cache 1212 can provide a performance boost that avoids processor delays while waiting for data. These and other modules can control the processor 1210 to perform various actions. Other system memory 1215 may be available for use as well. The memory 1215 can include multiple different types of memory with different performance characteristics. The processor 1210 can include any general purpose processor and a hardware module or software module, such as module 1 1232, module 2 1234, and module 3 1236 stored in the storage device 1230, configured to control the processor 1210 as well as a special-purpose processor where software instructions are incorporated into the actual processor design. The processor 1210 may essentially be a completely self-contained computing system, containing multiple cores or processors, a bus, memory controller, cache, etc. A multi-core processor may be symmetric or asymmetric.

To enable user interaction with the computing system 1200, an input device 1245 can represent any number of input mechanisms, such as a microphone for speech, a touch-protected screen for gesture or graphical input, keyboard, mouse, motion input, speech and so forth. An output device 1235 can also be one or more of a number of output mechanisms known to those of skill in the art. In some instances, multimodal systems can enable a user to provide multiple types of input to communicate with the computing system 1200. The communications interface 1240 can govern and manage the user input and system output. There may be no restriction on operating on any particular hardware arrangement and therefore the basic features here may easily be substituted for improved hardware or firmware arrangements as they are developed.

The storage device 1230 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 1230 can include the software modules 1232, 1234, 1235 for controlling the processor 1210. Other hardware or software modules are contemplated. The storage device 1230 can be connected to the system bus 1205. In some embodiments, a hardware module that performs a particular function can include a software component stored in a computer-readable medium in connection with the necessary hardware components, such as the processor 1210, bus 1205, output device 1235, and so forth, to carry out the function.

FIG. 13 illustrates an example architecture for a chipset computing system 1350 that can be used in accordance with an embodiment. The computing system 1350 can include a processor 1355, representative of any number of physically and/or logically distinct resources capable of executing software, firmware, and hardware configured to perform identified computations. The processor 1355 can communicate with a chipset 1350 that can control input to and output from the processor 1355. In this example, the chipset 1350 can output information to an output device 1355, such as a display, and can read and write information to storage device 1370, which can include magnetic media, solid state media, and other suitable storage media. The chipset 1350 can also read data from and write data to RAM 1375. A bridge 1380 for interfacing with a variety of user interface components 1385 can be provided for interfacing with the chipset 1350. The user interface components 1385 can include a keyboard, a microphone, touch detection and processing circuitry, a pointing device, such as a mouse, and so on. Inputs to the computing system 1350 can come from any of a variety of sources, machine generated and/or human generated.

The chipset 1350 can also interface with one or more communication interfaces 1390 that can have different physical interfaces. The communication interfaces 1390 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 1355 analyzing data stored in the storage device 1370 or the RAM 1375. Further, the computing system 1350 can receive inputs from a user via the user interface components 1385 and execute appropriate functions, such as browsing functions by interpreting these inputs using the processor 1355.

It will be appreciated that computing systems 1200 and 1350 can have more than one processor 1210 and 1355, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Figure 14:
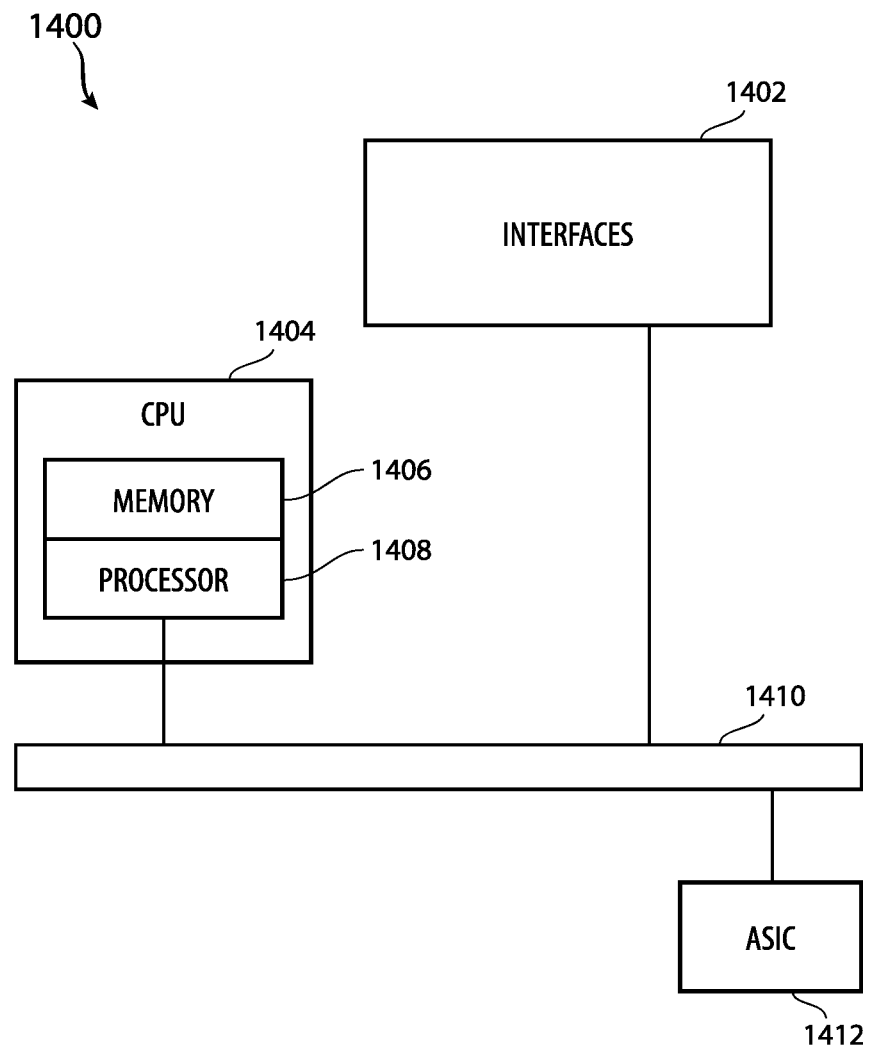
FIG. 14 illustrates an example of computing system architecture.

FIG. 14 illustrates an example network device 1400 suitable for implementing PIM routing and performing switching, routing, and other networking operations. Network device 1400 includes a central processing unit (CPU) 1404, interfaces 1402, and a connection 1410 (e.g., a PCI bus). When acting under the control of appropriate software or firmware, the CPU 1404 is responsible for executing packet management, error detection, and/or routing functions. The CPU 1404 preferably accomplishes all these functions under the control of software including an operating system and any appropriate applications software. CPU 1404 may include one or more processors 1408, such as a processor from the INTEL X36 family of microprocessors. In some cases, processor 1408 can be specially designed hardware for controlling the operations of network device 1400. In some cases, a memory 1406 (e.g., non-volatile RAM, ROM, etc.) also forms part of CPU 1404. However, there are many different ways in which memory could be coupled to the system.

The interfaces 1402 are typically provided as modular interface cards (sometimes referred to as "line cards"). Generally, they control the sending and receiving of data packets over the network and sometimes support other peripherals used with the network device 1400. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 1404 to efficiently perform routing computations, network diagnostics, security functions, etc.

Although the system shown in FIG. 14 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 1400.

Regardless of the network device's configuration, it may employ one or more memories or memory modules (including memory 1406) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1406 could also hold various software containers and virtualized execution environments and data.

The network device 1400 can also include an application-specific integrated circuit (ASIC) 1412, which can be configured to perform routing and/or switching operations. The ASIC 1412 can communicate with other components in the network device 1400 via the connection 1410, to exchange data and signals and coordinate various types of operations by the network device 1400, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A method comprising:
   registering, by an enterprise controller on an enterprise domain, in a shared mapping system on a service provider domain, one or more entries specifying one or more services for one or more classes of traffic to yield registered entries;
   reading, by a service provider controller, from the shared mapping system, the registered entries;
   posting, by the service provider controller, the one or more entries to one or more routing tables at a software-defined wide area network of the service provider domain; and
   receiving a request, by a mobile node on the enterprise domain, of a specific service for a particular class of packets according to a classification of the particular class of packets based on a particular label defined in the registered entries for the specific service.

2. The method of claim 1, further comprising:
   receiving, by an ingress router on the software-defined wide area network, a packet having a tag classifying the packet as the particular class of packets; and
   based on the tag classifying the packet as the particular class of packets, routing, by the ingress router, the packet to a particular transport corresponding to the specific service associated with the particular class of packets.

3. The method of claim 1, wherein the services are related to latency services.

4. The method of claim 2, wherein the particular transport comprises a particular latency transport that corresponds to a specific latency service.

5. The method of claim 1, further comprising:
   routing a packet received from the mobile node to the specific service.

6. The method of claim 5, wherein the specific service is associated with a latency.

7. The method of claim 1, wherein the request is associated with a color.

8. A system comprising:
one or more processors; and
a computer-readable storage device having stored therein instructions which, when executed by the one or more processors, cause the system to perform operations comprising:
registering, by an enterprise controller on an enterprise domain, in a shared mapping system on a service provider domain, one or more entries specifying one or more services for one or more classes of traffic to yield registered entries;
posting, by a service provider controller, the one or more entries to one or more routing tables at a software-defined wide area network of the service provider domain; and
receiving a request, by a mobile node on the enterprise domain, of a specific service for a particular class of packets according to a classification of the particular class of packets based on a particular label defined in the registered entries for the specific service.

9. The system of claim 8, wherein the computer-readable storage device stores additional instructions therein which, when executed by the one or more processors, cause the system to perform operations further comprising:
receiving, by an ingress router on the software-defined wide area network, a packet having a tag classifying the packet as the particular class of packets; and
based on the tag classifying the packet as the particular class of packets, routing, by the ingress router, the packet to a particular transport corresponding to the specific service associated with the particular class of packets.

10. The system of claim 8, wherein the services are related to latency services.

11. The system of claim 9, wherein the particular transport comprises a particular latency transport that corresponds to a specific latency service.

12. The system of claim 8, wherein the computer-readable storage device stores additional instructions therein which, when executed by the one or more processors, cause the system to perform operations further comprising:
routing a packet received from the mobile node to the specific service.

13. The system of claim 12, wherein the specific service is associated with a latency.

14. The system of claim 8, wherein the request is associated with a color.

15. A non-transitory computer-readable storage medium storing instructions which, when executed by one or more processors, cause the one or more processors to perform operations comprising:
registering, by an enterprise controller on an enterprise domain, in a shared mapping system on a service provider domain, one or more entries specifying one or more services for one or more classes of traffic to yield registered entries;
posting, by a service provider controller, the one or more entries to one or more routing tables at a software-defined wide area network of the service provider domain; and
receiving a request, by a mobile node on the enterprise domain, of a specific service for a particular class of packets according to a classification of the particular class of packets based on a particular label defined in the registered entries for the specific service.

16. The non-transitory computer-readable storage medium of claim 15, wherein the non-transitory computer-readable storage medium stores additional instructions therein which, when executed by the one or more processors, cause the one or more processors to perform operations further comprising:
receiving, by an ingress router on the software-defined wide area network, a packet having a tag classifying the packet as the particular class of packets; and
based on the tag classifying the packet as the particular class of packets, routing, by the ingress router, the packet to a particular transport corresponding to the specific service associated with the particular class of packets.

17. The non-transitory computer-readable storage medium of claim 15, wherein the services are related to latency services.

18. The non-transitory computer-readable storage medium of claim 16, wherein the particular transport comprises a particular latency transport that corresponds to a specific latency service.

19. The non-transitory computer-readable storage medium of claim 15, wherein the non-transitory computer-readable storage medium stores additional instructions therein which, when executed by the one or more processors, cause the one or more processors to perform operations further comprising:
routing a packet received from the mobile node to the specific service.

20. The non-transitory computer-readable storage medium of claim 19, wherein the specific service is associated with a latency.

* * * * *